United States Patent [19]

Nonaka

[11] Patent Number: 5,136,148
[45] Date of Patent: Aug. 4, 1992

[54] SPEED DETECTION APPARATUS FOR CAMERA

[75] Inventor: Osamu Nonaka, Sagamihara, Japan

[73] Assignee: Olympus Optical Co., Ltd., Tokyo, Japan

[21] Appl. No.: 720,738

[22] Filed: Jun. 25, 1991

[30] Foreign Application Priority Data

| | | |
|---|---|---|
| Jul. 4, 1990 [JP] | Japan | 2-177044 |
| Jul. 4, 1990 [JP] | Japan | 2-177045 |
| Jul. 4, 1990 [JP] | Japan | 2-177046 |
| Jul. 6, 1990 [JP] | Japan | 2-178611 |
| Sep. 26, 1990 [JP] | Japan | 2-257905 |

[51] Int. Cl.$^5$ ............................................. G01J 1/20
[52] U.S. Cl. ................................. 250/201.4; 250/561; 354/403
[58] Field of Search ............... 250/201.4, 201.8, 201.7, 250/201.6; 356/1, 4, 5; 354/402, 403

[56] References Cited

U.S. PATENT DOCUMENTS

| | | | |
|---|---|---|---|
| 4,247,761 | 1/1981 | Stein | 250/201.7 |
| 4,660,955 | 4/1987 | Ishida et al. | 354/402 |
| 4,855,585 | 8/1989 | Nonaka | |

FOREIGN PATENT DOCUMENTS 62-232571 10/1987 Japan .
63-159817 7/1988 Japan .

Primary Examiner—David C. Nelms
Assistant Examiner—K. Shami
Attorney, Agent, or Firm—Frishauf, Holtz, Goodman & Woodward

[57] ABSTRACT

A speed detection apparatus includes a projection unit for repetitively projecting a pulse beam toward an object. A light-receiving unit is arranged to be separated from the projection unit by a base length, receives the pulse beam reflected by the object, and generates an output according to the light-receiving position. A distance calculation unit calculates a distance signal according to a distance to the object upon reception of an output from the light-receiving unit. An integration circuit integrates the distance signal every time the pulse beam is projected. A speed calculation unit calculates a moving speed of the object on the basis of an output from the integration circuit.

38 Claims, 25 Drawing Sheets

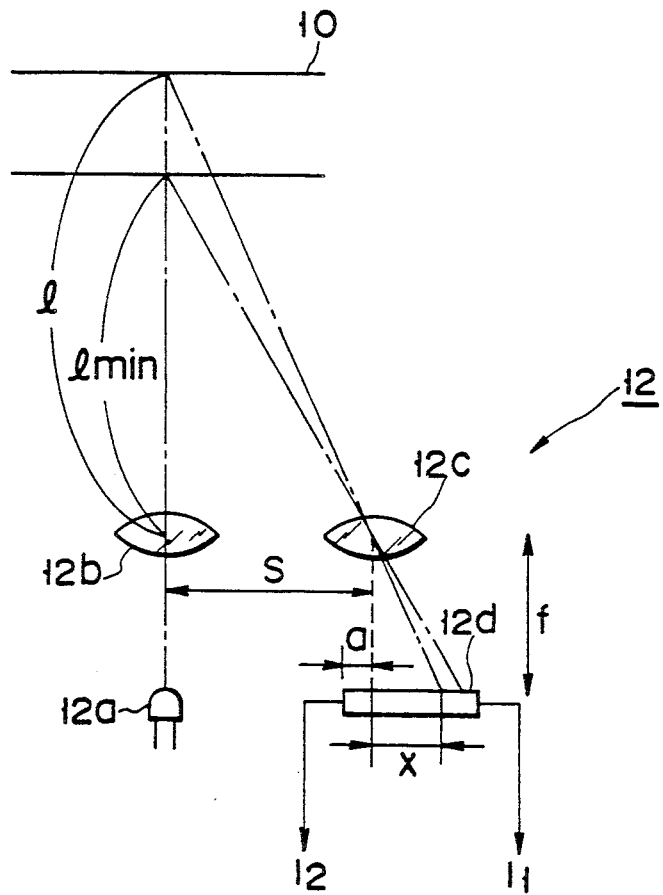
F I G. 3

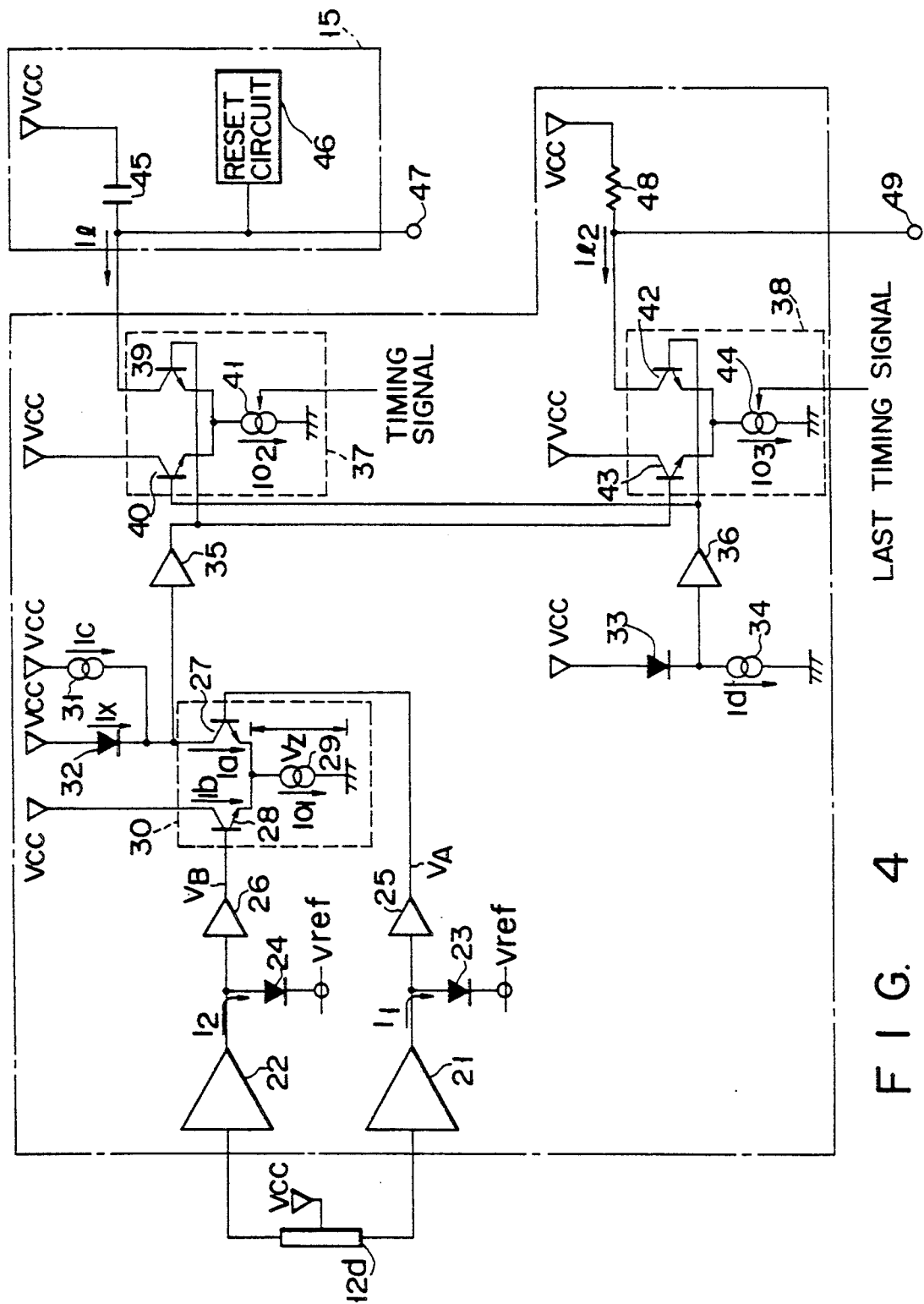
F I G. 4

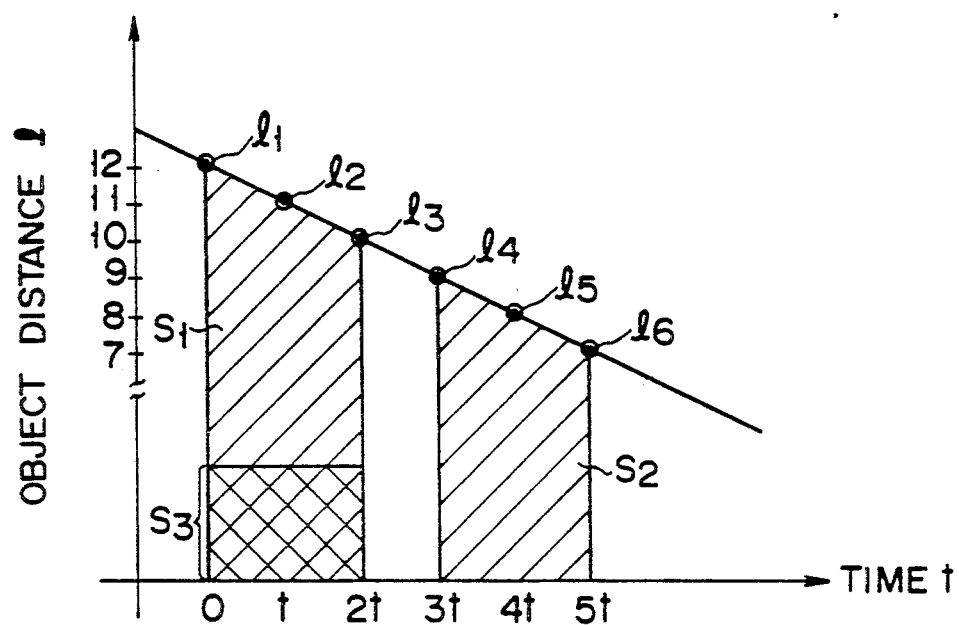
F I G. 6A
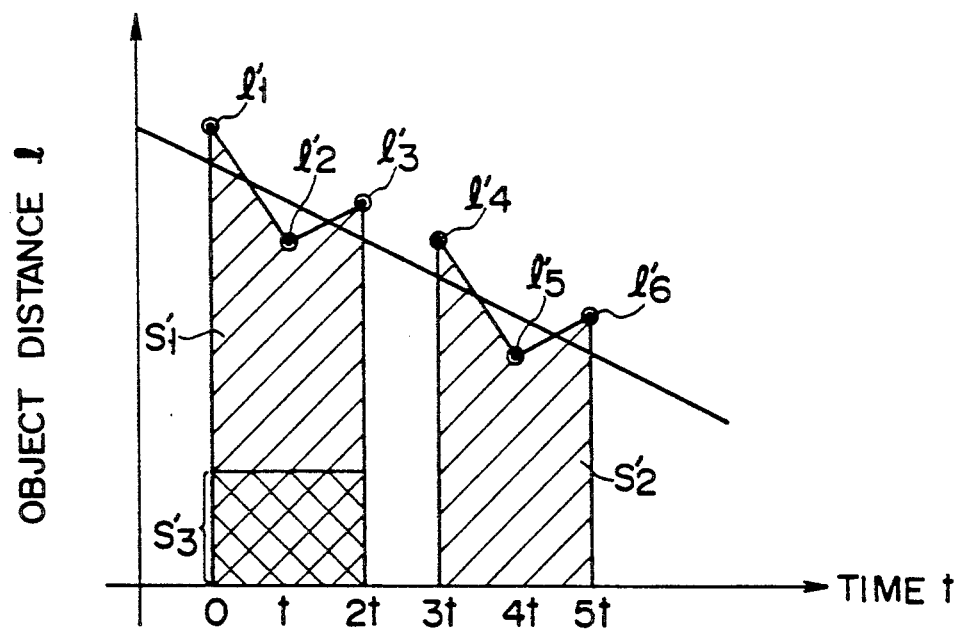
F I G. 6B

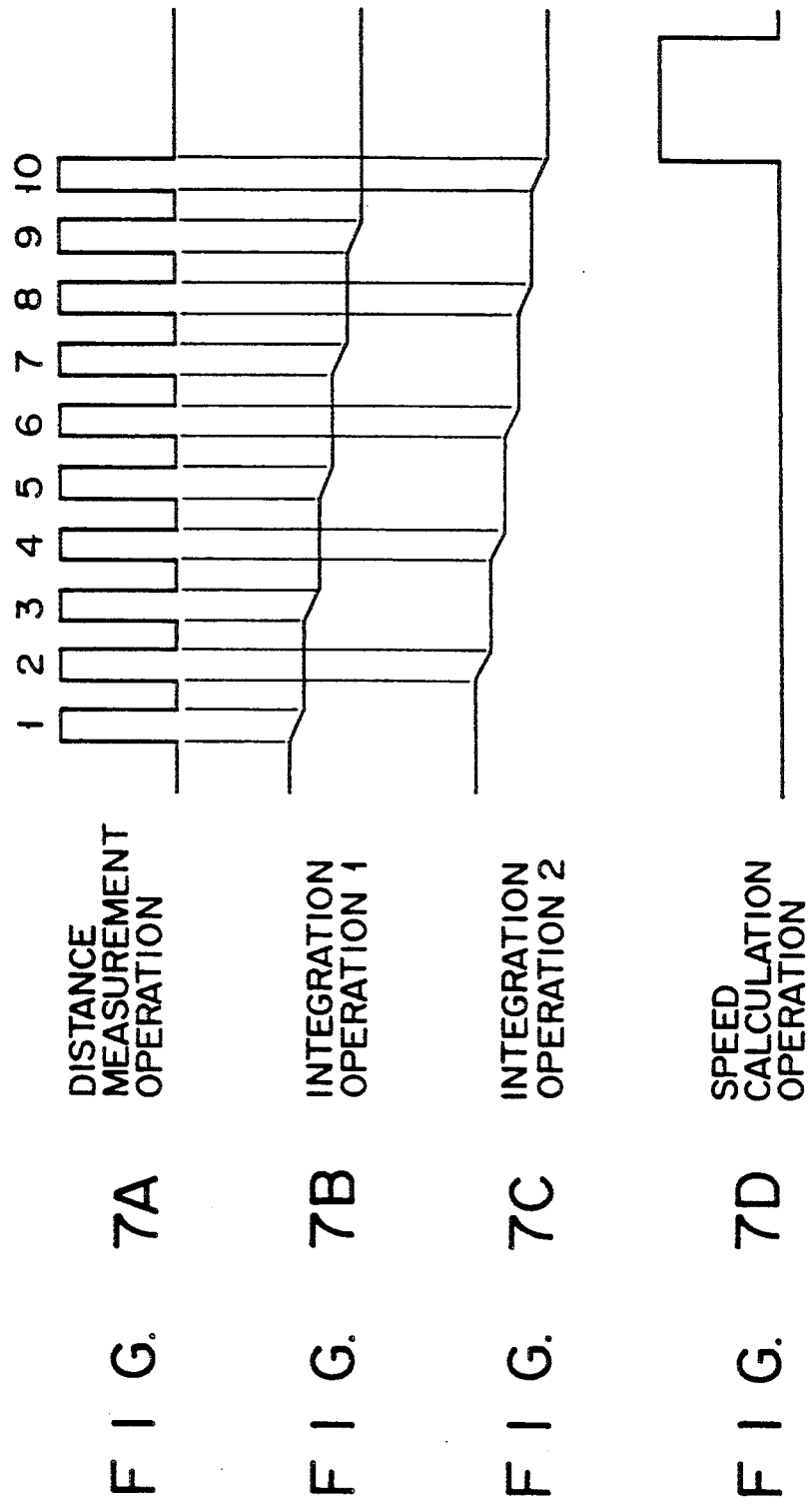

FIG. 9A DISTANCE MEASUREMENT OPERATION

FIG. 9B INTEGRATION OPERATION 1

FIG. 9C INTEGRATION OPERATION 2

FIG. 9D SPEED CALCULATION OPERATION

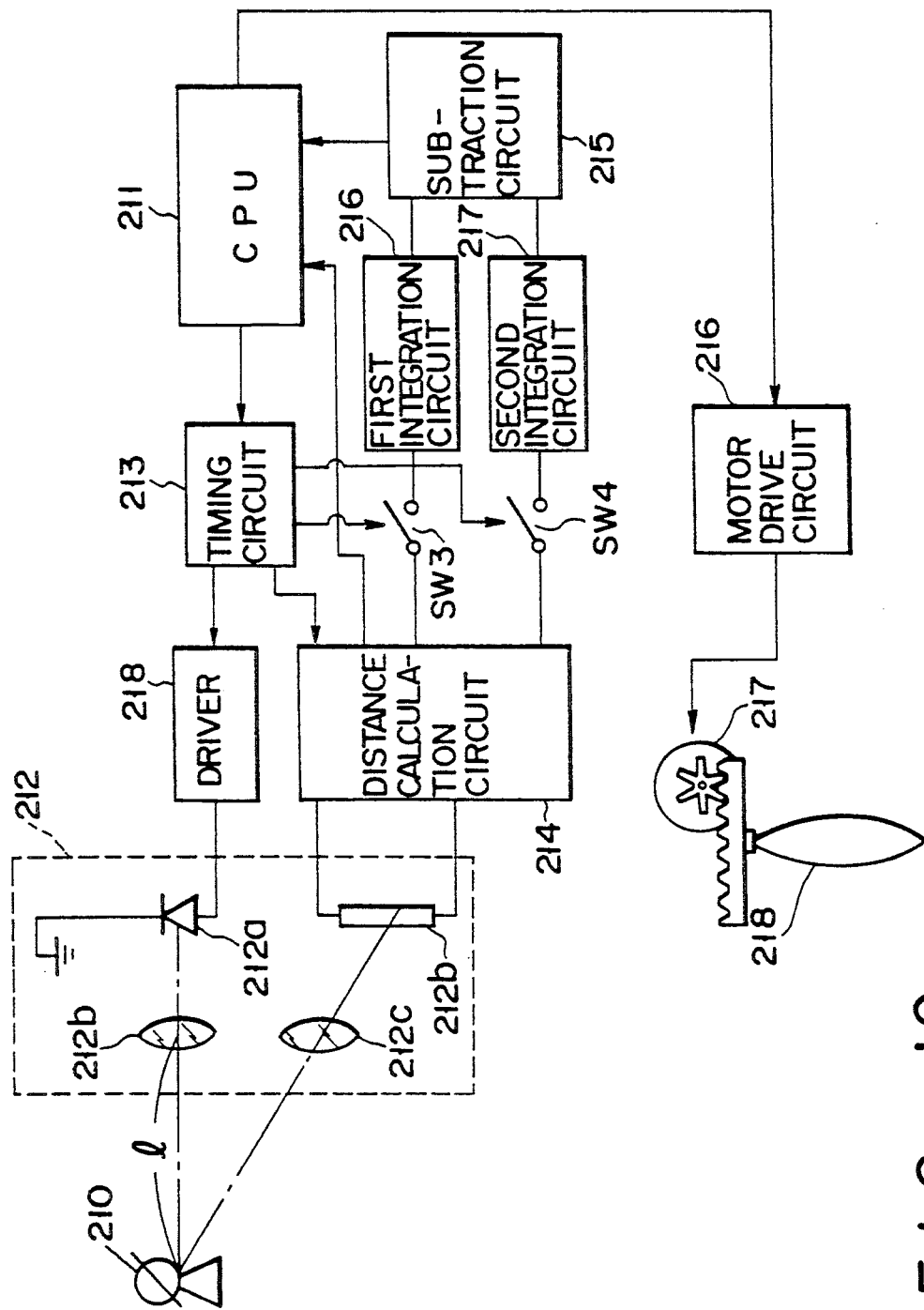
F I G. 10

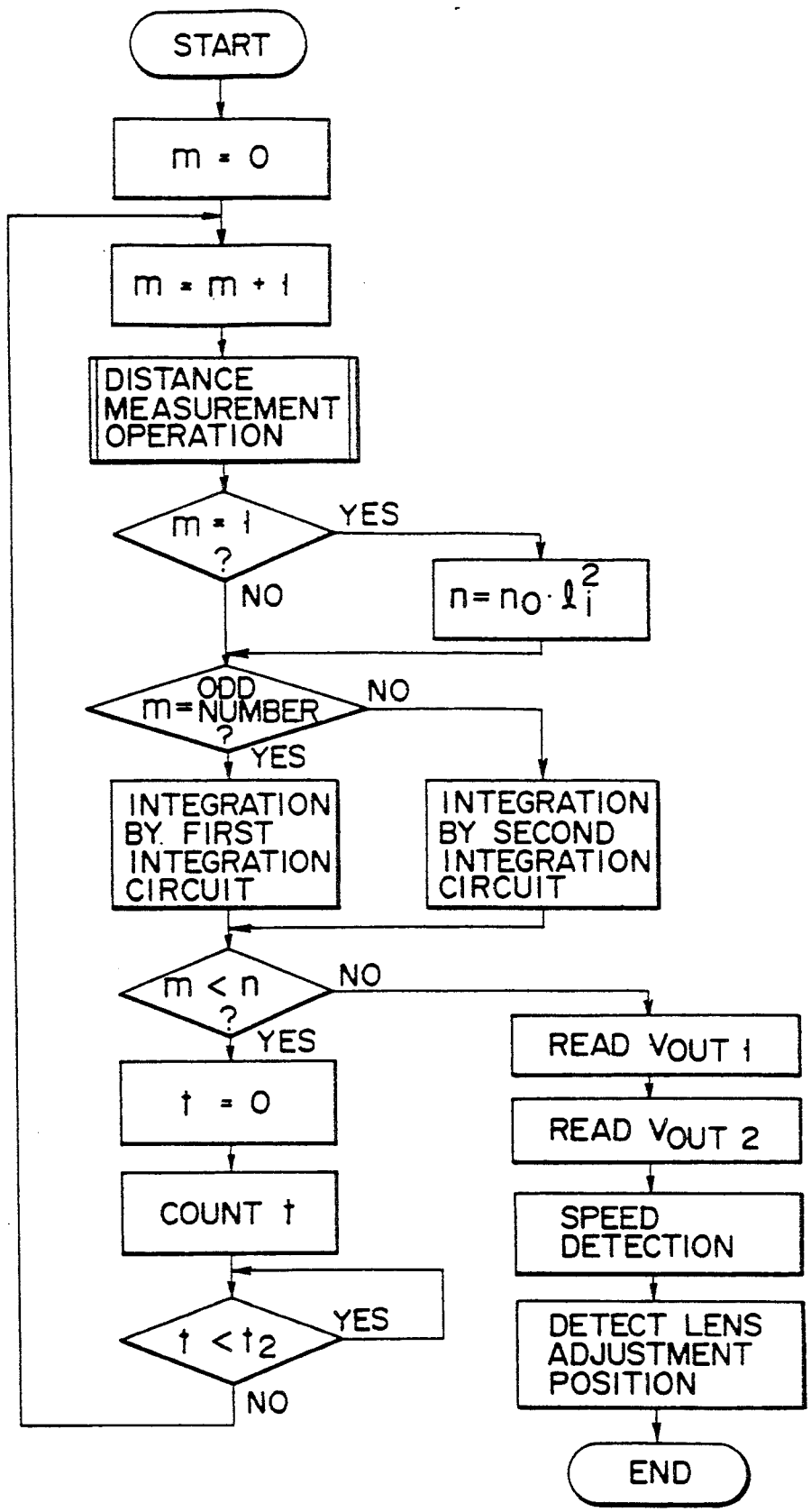
F I G. 12

FIG. 16A DISTANCE MEASUREMENT OPERATION AND TIM𝓁

FIG. 16B TIMV

FIG. 16C vref𝓁 VL2

FIG. 16D OUTPUT FROM GATE 55

FIG. 16E VOUT ----- vrefv

FIG. 16F OUTPUT FROM GATE 55

FIG. 16G ALARM

| $\Delta 1/\ell$ \ $1/\ell 1$ | $1/5$ (m) | $1/2.5$ (m) | $1/1.67$ (m) | $1/1.25$ (m) OR MORE |
|---|---|---|---|---|
| 0.1 | 0.1 | 0.05 | 0.05 | 0.05 |
| 0.2 | 0.5 | 0.2 | 0.15 | 0.15 |
| 0.3 | (ALARM) | 0.35 | 0.25 | 0.23 |
| 0.4 | (ALARM) | 0.9 | 0.45 | 0.35 |
| 0.5 OR MORE | (ALARM) | (ALARM) | 0.65 | 0.5 |

FIG. 22

SPEED DETECTION APPARATUS FOR CAMERA

BACKGROUND OF THE INVENTION

1. Field of the Invention

The present invention relates to an moving speed detection apparatus and, more particularly, to an object moving speed detection apparatus, which is applied to an auto-focus photographing apparatus of a camera, for driving a taking lens to an in-focus position on the basis of a focus detection output, and detects a moving speed of an object so as to prevent defocusing caused by movement of the object in the optical axis direction of the taking lens.

2. Description of the Related Art

Conventionally, when an object moving in the optical axis direction of a taking lens is to be photographed, defocusing occurs due to movement of the object during a release time lag.

As a technique for preventing defocusing, for example, Published Unexamined Japanese Patent Application No. 63-159817 discloses a technique for performing a plurality of times of distance measurement operations in response to a first release signal to predict the position of an object at the beginning of exposure, and driving a taking lens. In a field other than cameras, as described in, e.g., Published Unexamined Japanese Patent Application No. 62-232571, a method of projecting infrared rays onto an object to be measured, and detecting a moving speed of the object to be measured on the basis of a signal reflected by the object has been proposed.

A conventional speed detection apparatus will be described below with reference to Published Unexamined Japanese Patent Application No. 63-159817 described above.

In FIG. 23, reference numeral 1 denotes an object; and 2 to 4, a distance measurement optical system, a light-emitting element driver, and a distance calculation circuit, which constitute a distance measurement apparatus.

When an infrared light-emitting diode (IRED) 2a included in the distance measurement optical system 2 is driven by the light-emitting element driver 3, light from the IRED 2a is projected onto the object 1 via a projection lens 2b. The light projected onto the object 1 is reflected by the object, is received by a light-receiving lens 2c, and is then focused on an optical signal currents $I_1$ and $I_2$ according to the incident position of the reflected signal light. The signal currents $I_1$ and $I_2$ are processed by the distance calculation circuit 4, thus obtaining a distance to the object 1.

In the speed detection apparatus, the above-mentioned distance measurement operation is repeated at predetermined time intervals in accordance with a timing circuit 5. After the distance measurement result is stored in a distance data memory 6, a positional displacement of the object 1 in a predetermined period of time is calculated, thereby detecting the moving speed of the object.

In order to discriminate a change in speed, the speed detection apparatus comprises a special-purpose function determination circuit 7 consisting of an order discrimination circuit 7a, a linear function determination circuit 7b, and a quadratic function determination circuit 7c, and also includes a distance prediction/calculation circuit 8 for predicting a distance to an object at a photographing timing (at the beginning of exposure), a control circuit 9 for controlling these circuits, and the like.

The conventional speed detection apparatus is effective when a distance measurement time is negligibly short, and a distance measurement result includes no error at all.

However, in practice, these factors must be taken into consideration, and the apparatus suffers from the following drawbacks. More specifically, in order to strictly obtain an order of a function of a moving speed of the object 1 on the basis of distance data, complicated circuits are required, and the apparatus becomes expensive. When calculations are performed in a software manner using a one-clip microcomputer (e.g., a CPU), its calculation time is not negligible, and it is impossible to detect a speed of an object moving at high speed, such as an automobile.

For these reasons, the speed detection apparatus requires a distance measurement apparatus which can minimize a distance measurement error, and can perform a distance measurement operation at high speed. However, electronic circuits inevitably suffer from noise, and it is not easy to manufacture an ideal distance measurement apparatus.

The present applicant has made a proposal for realizing a high-precision auto-focus operation based on a noise canceling effect by an integration (e.g., Published Unexamined Japanese Patent Application No. 63-132110 (corresponding to U.S. Pat. No. 4,855,585)). However, in a distance measurement system which causes an IRED to emit light a plurality of times, a time lag is prolonged, and this method is not suitable for the speed detection apparatus.

FIGS. 24A to 24C show a general speed detection operation employing the conventional distance measurement system.

More specifically, when it is difficult to assure precision by a single distance measurement operation, the distance measurement operation is performed a plurality of times, so that noise components randomly included in distance measurement results can be canceled. However, as shown in FIG. 24A, when a plurality of times (e.g., four times) of distance measurement operations are performed during a time interval ($\alpha$), a time lag is caused accordingly. In addition, since an object distance also changes during the four distance measurement operations, this method is not effective for measuring a distance to a moving object.

During a distance calculation operation for calculating a precise distance measurement result on the basis of the four distance measurement results during a time interval ($\beta$), a time lag is also caused accordingly.

After the time interval ($\beta$), four distance measurement operations are performed during a time interval ($\gamma$) similar to the time interval ($\alpha$), and a distance calculation operation for obtaining a precise distance measurement result based on the four results is performed during a time interval ($\delta$). Thereafter, when a moving speed of an object is to be calculated using these two calculation results, a time interval ($\epsilon$) for a speed calculation operation is required. As a result, a very long speed detection time is necessary.

Since a distance to a moving object is measured, the advantage of repeating a distance measurement operation a plurality of times is lost due to a change in moving object during the distance measurement operations.

Therefore, a considerable difficulty is expected in high-precision distance measurement operation with a short time lag, and speed detection of an object according to the conventional concept.

When an object is moving at a constant speed, the conventional speed detection apparatus poses the following problems when it is applied to an auto-focus photographing apparatus for a camera.

As shown in FIG. 25, in a normal taking lens, the following relation is established among an object distance l, a focal length $f_L$ of the lens, and a distance (extension amount) K between a film and the lens:

$$K \cdot l = f_L^2$$

That is, $$K = f_L^2 \cdot 1/l$$

Therefore, assuming that an object moves by 1 m during a given shutter time lag, an increase in defocusing amount is larger in a case wherein the object is moved from a 2-m position to a 1-m position than in a case wherein the object is moved from a 3-m position to a 2-m position. For this reason, when speed detection of an object at a near distance is performed with the same time lag as that for an object at a far distance, an extension correction amount based on moving object prediction becomes too large, and an error is increased accordingly. In the worst case, an object may pass a camera position at the start timing of exposure, resulting in an unsuccessful photographing operation.

In a so-called active system for performing a distance measurement operation by causing an IRED to emit light, when a time interval between distance measurement operations, i.e., an emission interval of the IRED is shortened, the IRED is heated by a drive current, and this leads to a decrease in light amount or destruction of the IRED. Therefore, it is impossible to shorten a time interval between distance measurement operations for speed detection with a simple arrangement.

SUMMARY OF THE INVENTION

It is, therefore, an object of the present invention to provide a speed detection apparatus which can precisely detect a moving speed of an object at high speed, and can be realized by a simple arrangement.

In order to achieve the above object, a speed detection apparatus of the present invention comprises:

projection means for repetitively projecting pulse light toward an object;

light-receiving means, arranged to be separated from the projection means by a base length, for receiving the pulse light reflected by the object, and generating an output according to a light-receiving position;

distance calculation means for calculating a distance signal according to a distance to the object upon reception of an output from the light-receiving means;

integration means for integrating the distance signal every time the pulse light is projected; and speed calculation means for calculating a moving speed of the object on the basis of an output from the integration means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing in detail a distance measurement optical system;

FIG. 4 is a detailed circuit diagram of a circuit for integrating distance data;

FIGS. 6A and 6B are graphs for explaining an integration operation in the second embodiment;

FIGS. 7A to 7D are timing charts for explaining the operation of the apparatus shown in FIG. 5;

FIG. 10 is a schematic block diagram showing an arrangement of a speed detection apparatus according to the third embodiment of the present invention;

FIG. 12 is a flow chart for explaining an operation executed when the number of times of distance measurement operations is varied;

FIGS. 16A to 16G are timing charts for explaining a reset operation;

FIG. 22 shows a table for obtaining a correction amount on the basis of a distance measurement result and a rate of displacement over time;

DETAILED DESCRIPTION OF THE PREFERRED EMBODIMENTS

The preferred embodiments of the present invention will be described hereinafter with reference to the accompanying drawings.

Figure 1:
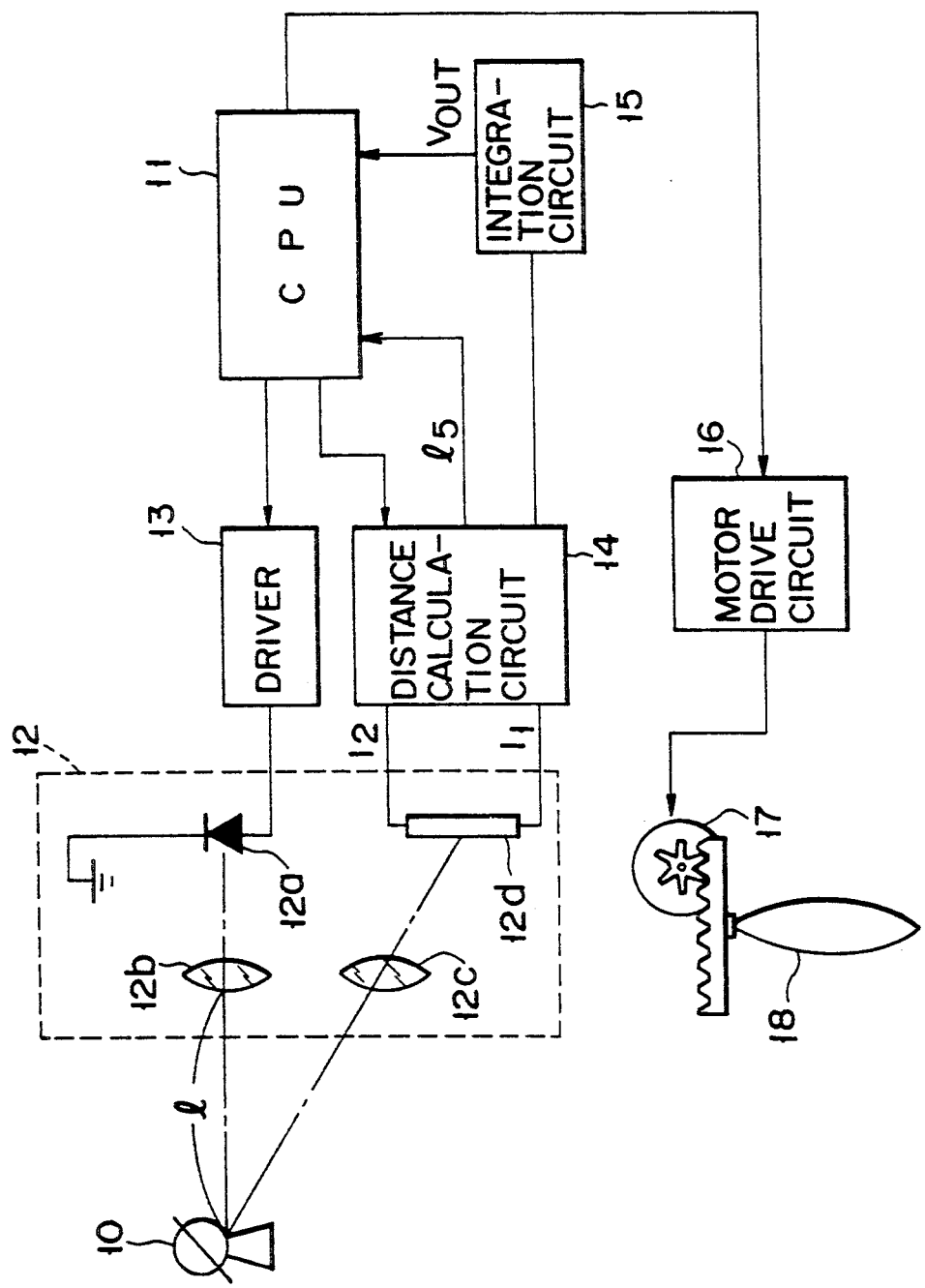
FIG. 1 is a schematic block diagram showing an arrangement of a speed detection apparatus according to the first embodiment of the present invention.

FIG. 1 shows a schematic arrangement of an object moving speed detection apparatus according to the first embodiment of the present invention.

More specifically, a CPU 11 controls the entire apparatus. The CPU 11 is connected to a driver 13, a distance calculation circuit (AF circuit) 14, and an integration circuit 15.

The driver 13 drives an infrared light-emitting diode (IRED) 12a included in a distance measurement optical system 12, and causes the IRED 12a to emit light a plurality of times at given time intervals under the control of the CPU 11.

The distance measurement optical system 12 comprises the IRED 12a, a projection lens 12b for projecting light (infrared signal) from the IRED 12a toward light reflected by the object 10, and an optical position detection element (PSD) 12d for generating signal currents $I_1$ and $I_2$ according to an incident position of the reflected signal light received by the light-receiving lens 12c.

The distance calculation circuit 14 performs an analog calculation using an output signal from the PSD 12d based on light projected from the IRED 12a, thereby obtaining a distance l to the object 10.

The integration circuit 15 sequentially integrates distance measurement results of the distance calculation circuit 14.

The CPU 11 controls drive timings of the driver 13 and the distance calculation circuit 14, and calculates a moving speed of the object 10 in the optical axis direction on the basis of the distance measurement result (ln) of the distance calculation circuit 14, and the integration result ($V_{OUT}$) of the integration circuit Thereafter, the CPU 11 sends a control signal to a motor drive circuit 16 in accordance with the calculated moving speed. The motor drive circuit 16 drives a motor 17 in response to the control signal to move a taking lens 18 to an in-focus position.

Figure 2A:
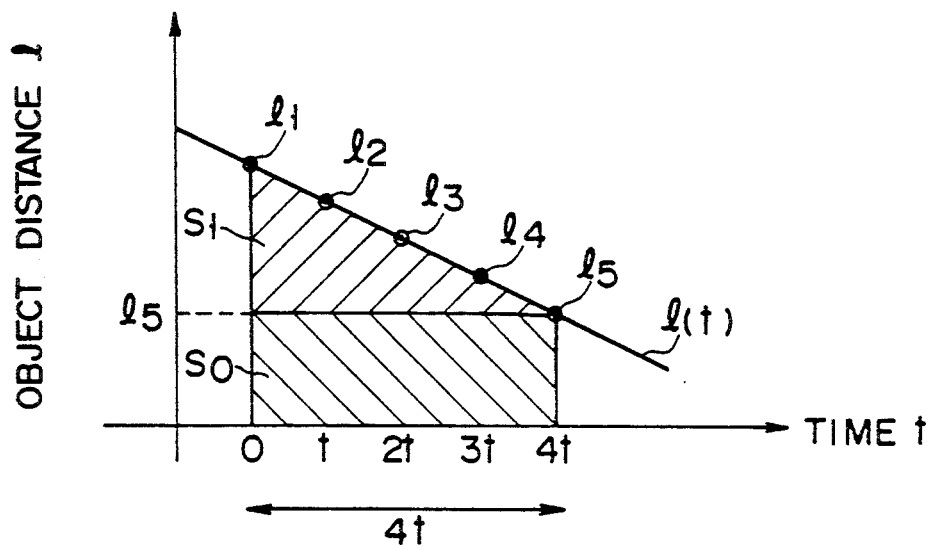
FIGS. 2A and 2B are graphs for explaining an integration operation in the first embodiment.
Figure 2B:
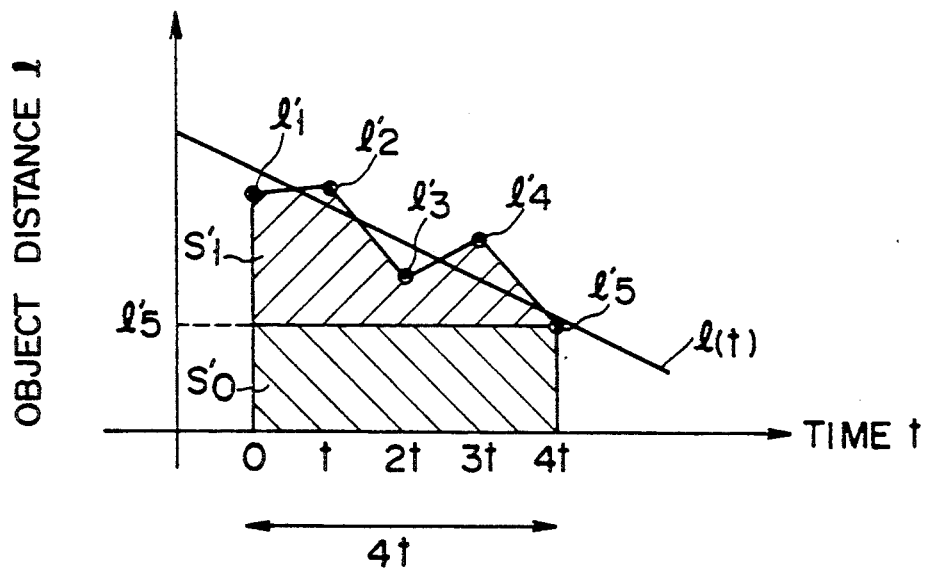

FIGS. 2A and 2B show integration results of the integration circuit 15.

In FIGS. 2A and 2B, an object distance (l) is plotted along the ordinate, and time (t) is plotted along the abscissa. A line (l(t)) represents a state wherein the object 10 is moved at an equal speed.

In FIG. 2A, distance measurement results at timings 0, t, 2t, 3t, and 4t are respectively represented by $l_1$, $l_2$, $l_3$, $l_4$, and $l_5$, and are assumed to include no error.

An integration result in this case is a total area of a hatched portion in FIG. 2A, i.e., a sum ($S_1+S_0$) of a right-up hatched portion $S_1$ and a right-down hatched portion $S_2$.

In general, a speed v is given by:

$$v = \Delta l / \Delta t \tag{1}$$

Therefore, the speed v of the object 10 which is moving at an equal speed in a time width 4t can be calculated by:

$$v \propto S_1/4t \tag{2}$$

In this case, the value $S_1$ cannot be determined unless the integration result ($S_1+S_2$) and $S_0$ are obtained. However, the value $S_0$ can be calculated by:

$$S_0 = l_5 \times 4t \tag{3}$$

In this manner, the moving speed v of the object 10 can be calculated according to the integration result, the last distance measurement result, and the time width of the distance measurement operation.

FIG. 2B exemplifies a case wherein distance measurement results $l'_1$, $l'_2$, $l'_3$, $l'_4$, and $l'_5$ at timings 0, t, 2t, 3t, and 4t suffer from variations.

When it is expected that variations randomly occur in this manner, an integration result $S'_1+S'_0$ is almost equal to $S_1+S_0$ in FIG. 2A by the integration effect.

Therefore, even when each distance measurement result includes an error, very high-precision speed detection can be realized according to the relation given by equation (2).

In the above description, the number of times of distance measurement operations ($l_5$) is 5. However, the present invention is not limited to this. As the number of times is increased, the effect can be enhanced accordingly.

In order to predict a position $l_A$ of the object 10 after an elapse of a predetermined time $t_A$ on the basis of the obtained speed v and the last distance measurement result $l_B$, various methods, e.g., a method of predicting the position by calculating $l_A = l_B + v \cdot t_A$, have been known to those who are skilled in the art, and a detailed description thereof will be omitted here.

FIG. 3 shows in detail an arrangement of the distance measurement optical system 12.

The distance measurement optical system 12 constitutes a known one-point distance measurement apparatus, and employs a so-called active system for projecting AF light onto the object 10.

When the IRED 12a emits light, the light is projected onto the object 10 as AF light via the projection lens 12b. The AF light is reflected by the object 10, and is focused via the light-receiving lens 12c, thus forming an image on the PSD 12d.

In this case, an incident position x of reflected light is expressed as a function of the object distance l according to the principle of triangulation as follows:

$$x = \frac{S \cdot f}{l} \tag{4}$$

where S is the distance (base length) between the principal points of the projection lens 12b and the light-receiving lens 12c, and f is the distance from the light-receiving lens 12c. The PSD 12d is arranged at the position f.

The PSD 12d outputs two current signals $I_1$ and $I_2$ as a function of the incident position x. If a total signal light current is represented by $I_{p0}'$ and the length of the PSD 12d is represented by tp, $I_1$ and $I_2$ can be expressed as follows:

$$I_1 = \frac{a + x}{tp} \cdot I_{p0} \tag{5}$$

$$I_2 = \frac{t - (a + x)}{tp} \cdot I_{p0} \tag{6}$$

-continued $$\therefore \frac{I_1}{I_1 + I_2} = \frac{a + x}{tp} = \frac{1}{tp}\left(a + \frac{S \cdot f}{l}\right) \quad (7)$$

where a is the length between a point at which an extending line parallel to a line connecting the emission center of the IRED 12a and the principal point of the projection lens 12b and extended from the principal point of the light-receiving lens 12c crosses the PSD 12d, and the end of the PSD 12d on the side of the IRED 12a.

FIG. 4 shows a detailed circuit arrangement for integrating distance data by the integration circuit 15 using the output signals $I_1$ and $I_2$ from the PSD 12d.

In FIG. 4, reference numerals 21 and 22 denote preamplifiers for respectively fetching the output signals $I_1$ and $I_2$ of the PSD 12d at a low input impedance, and amplifying the fetched signals; and 23 and 24, compression diodes for respectively compressing the amplified currents $I_1$ and $I_2$.

Reference numerals 25 and 26 denote buffers for guiding compressed voltages from the compression diodes and 24 to a differential calculation circuit 30 comprising NPN transistors 27 and 28, and a current source 29.

The operation of the differential calculation circuit 30 will be described below using reference symbols in FIG. 4. The following relations are established:

$$V_A = V_T \ln \frac{Ia}{Is} + V_2 \quad (8)$$
$$= V_{ref} + V_T \ln \frac{I_1}{I_S}$$

$$V_B = V_T \ln \frac{Ib}{Is} + V_2 \quad (9)$$
$$= V_{ref} + V_T \ln \frac{I_2}{I_s}$$

where Is is the reverse saturation current of the transistors 27 and 28, and the diodes 23 and 24, and $V_T$ is the thermal voltage.

The currents Ia and Ib satisfy the following relation:

$$Ia + Ib = I_{01} \quad (10)$$

Thus, from equations (8), (9), and (10), the following relation can be established:

$$Ia = \frac{I_1}{I_1 + I_2} \cdot I_{01} \quad (11)$$

Therefore, from equations (7) and (11), we have:

$$Ia = \frac{1}{tp}\left(a + \frac{S \cdot f}{l}\right) \cdot I_{01} \quad (12)$$
$$= \frac{a}{tp} \cdot I_{01} + \frac{S \cdot f}{tp} \cdot I_{01} \cdot \frac{1}{l}$$

In this manner, the signal current Ia proportional to a reciprocal number of the object distance l can be obtained.

In FIG. 4, reference numeral 31 denotes a current source. A current Ic supplied from the current source 31 is given by:

$$Ic = \frac{a}{tp} \cdot I_{01} + Id \quad (13)$$

For this reason, a current Ix flowing through a compression diode 32 is given by:

$$IX = Ia - Ic \quad (14)$$
$$= \frac{S \cdot f}{tp} \cdot I_{01} \cdot \frac{1}{l} - Id$$

On the other hand, a current Id flows through a compression diode 33 from a current source 34. The compressed voltages from the compression diodes 32 and 33 are respectively input to circuits 37 and 38 having the same arrangement as that of the differential calculation circuit 30 via buffers 35 and 36.

Therefore, paying attention to the fact that the compression diodes 32 and 33 generate voltages with reference to the power source, an output current Il from the differential calculation circuit 37 comprising NPN transistors 39 and 40, and a current source 41 is given by:

$$Il = \frac{Id}{IX + Id} \cdot I_{02} \quad (15)$$

For this reason, from equation (14), the current Il is given by:

$$Il = Id \cdot I_{02} / \left(Id + \frac{S \cdot f}{tp} \cdot I_{01} \cdot \frac{1}{l} - Id\right) \quad (16)$$
$$= \frac{tp \cdot Id \cdot I_{02} \cdot l}{I_{01} \cdot S \cdot f}$$
$$\propto l$$

Thus, the current $I_l$ can be obtained as a current signal proportional to the object distance l.

More specifically, the differential calculation circuit 37 is a circuit for supplying the current signal according to the object distance l to the integration circuit 15. When the current source 41 is turned on in response to a timing signal generated every time the IRED 12a emits light, the current Il depending on the object distance l is integrated by an integration capacitor 45 of the integration circuit 15.

The integration capacitor 45 is reset by a reset circuit 46 prior to light emission of the IRED 12a. For this reason, upon completion of a series of distance measurement operations, a signal corresponding to an integration output indicated by $S_1 + S_0$ in FIG. 2A, or a signal corresponding to an integration output indicated by $S'_1 + S'_0$ in FIG. 2B appears at an output terminal 47.

On the other hand, the differential calculation circuit 38 constituted by NPN transistors 42 and 43, and a current source 44 is a circuit for obtaining the last distance measurement result, i.e., the distance measurement result $l_5$ in FIG. 2A. When the current source 44 is turned on at a timing 4t shown in FIG. 2A, current $Il_2$ flows through a resistor 48.

The current $Il_2$ satisfies the following relation depending on the object distance l like in equation (16):

$$Il_2 = \frac{tp \cdot Id \cdot I_{03}}{I_{01} \cdot S \cdot f} \cdot l \quad (17)$$

Therefore, only the last distance measurement result $l_5$ can be detected by the voltage signal output to an output terminal 49.

The voltage signals appearing at the output terminals 47 and 49 are fetched by an internal A/D converter (not shown) of the CPU 11 shown in FIG. 1, and the moving speed v of the object 10 is calculated by the above-mentioned method.

More specifically, from equation (16), the current Il is given by:

$$Il = A \cdot l \quad (18)$$

where A is a constant.

From FIG. 2A, the position l(t) of the object 10 is given by:

$$l(t) = l_5 - v(t - t_5) \quad (19)$$

$$\therefore Il = A\{l_5 - v(t - t_5)\} \quad (20)$$

If an integration time required for integrating this value is represented by T, an output voltage $V_{OUT}$ appearing at the output terminal 47 is given by:

$$\begin{aligned}
V_{OUT} &= \frac{1}{C} \int_0^T Il\,dt \quad (21) \\
&= \frac{A}{C}\left(-\frac{1}{2}vT^2 + l_5T + vt_5T\right) \\
&= \frac{A}{C}\left(v\left(t_5T - \frac{1}{2}T^2\right) + l_5T\right) \\
&= \frac{A}{C}(v \cdot B + l_5T)
\end{aligned}$$

where B is a constant, and C is the capacitance of the integration capacitor 45.

$$\therefore v = \frac{1}{B}\left(\frac{C \cdot V_{OUT}}{A} - l_5T\right) \quad (22)$$

In this manner, the moving speed v of the object 10 can be obtained based on the voltage $V_{OUT}$ appearing at the output terminal 47, i.e., an integration output obtained by integrating the distance measurement results, and data obtained from the output terminal 49, i.e., the last distance measurement result $l_5$, and, of course, the position of the object 10 after an elapse of a predetermined period of time can also be calculated (predicted).

As described above, according to the first embodiment of the present invention, the moving speed of an object is obtained using integration results and distance measurement results of a plurality of times of distance measurement operations.

More specifically, light emission by the IRED, and an integration of a distance measurement result based on the light emission are repeated a plurality of times, and the moving speed of the object is obtained on the basis of the integration result and the last distance measurement result. In this case, a series of operations, i.e., distance measurements and integrations, are realized by analog calculations, which can be instantaneously completed, and A/D conversion and speed detection calculations which require a relatively long time, are simultaneously performed after the completion of the above-mentioned series of operations. Thus, a distance measurement error which is inevitably present in a single distance measurement operation can be canceled, and high-speed processing can be performed. Therefore, high-precision, high-speed speed detection can be realized by a simple arrangement.

In this embodiment, the moving speed is obtained using the last distance measurement result. However, the present invention is not limited to this. For example, a result in the second or third measurement operation from the last operation, or a plurality of results including the last result may be used. The present invention is not limited to the distance l. For example, 1/distance (1/l) may be calculated, and may be used as a distance measurement result.

Figure 5:
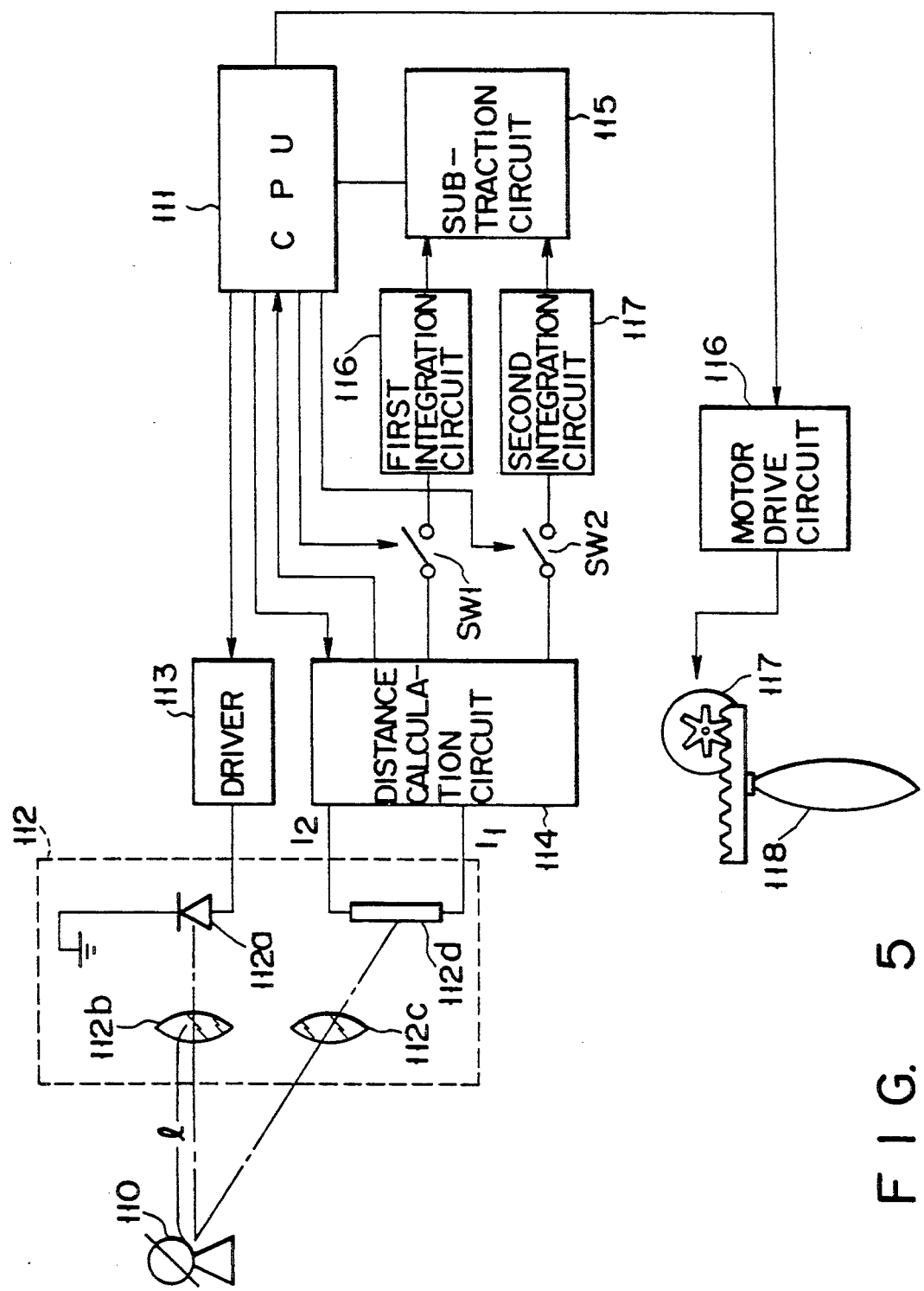
FIG. 5 is a schematic block diagram showing an arrangement of a speed detection apparatus according to the second embodiment of the present invention.

FIG. 5 shows a schematic arrangement of an object moving speed detection apparatus according to the second embodiment of the present invention.

More specifically, a CPU 111 controls the overall apparatus, and is connected to a driver 113, a distance calculation circuit (AF circuit) 114, and a subtraction circuit 115. First and second integration circuits 116 and 117 are arranged between the distance calculation circuit 114 and the subtraction circuit 115.

The driver 113 drives an infrared light-emitting diode (IRED) 112a included in a distance measurement optical system 112, and causes the IRED 112a to emit light a plurality of times at given time intervals under the control of the CPU 111.

The distance measurement optical system 112 comprises the IRED 112a, a projection lens 112b for projecting light (infrared light signal) from the IRED 112a toward an object 110, a light-receiving lens 112c for receiving light reflected by the object 110, and an optical position detection element (PSD) 112d for generating signal currents $I_1$ and $I_2$ according to an incident position of the reflected signal light received by the light-receiving lens 112c.

The distance calculation circuit 114 calculates an output signal from the PSD 112d based on light emission by the IRED 112a in an analog manner, and obtains a distance l to the object 110.

The first integration circuit 116 sequentially integrates distance measurement results by the distance calculation circuit 114, which results are supplied through a switch SW1. The switch SW1 is turned on/off under the control of the CPU 111.

The second integration circuit 117 sequentially integrates distance measurement results by the distance calculation circuit 114, which results are supplied through a switch SW2. The switch SW2 is turned on/off under the control of the CPU 111.

The subtraction circuit 115 calculates the difference between the integration outputs respectively supplied from the first and second integration circuits 116 and 117.

The CPU 111 controls drive timings of the driver 113, and an operation for extracting a signal light component from steady light components in the distance calculation circuit 114, and calculates a moving speed of the object 110 in the optical axis direction on the basis of an output from the subtraction circuit 115. Thereafter, a taking lens 118 is moved to an in-focus position by the above-mentioned method on the basis of the calculated moving speed.

The CPU 111 controls integration timings (switching timings of the switches SW1 and SW2) of the first and second integration circuits 116 and 117. More specifically, every time the CPU 111 causes the IRED 112a to emit light via the driver 113, it controls ON/OFF states of the switches SW1 and SW2.

FIGS. 6A and 6B show integration results of the first and second integration circuits 116 and 117.

In FIGS. 6A and 6B, an object distance (l) is plotted along the ordinate, and a time (t) is plotted along the abscissa. A line (l(t)) represents the relationship between l and t when the object 110 is moved at an equal speed.

In this embodiment, in practice, the switches SW1 and SW2 are alternately turned on, thereby performing integration operations. As the simplest example, a case will be described below wherein the first three distance measurement results are integrated by the first integration circuit 116, and the next three distance measurement results are integrated by the second integration circuit 117.

In FIG. 6A, distance measurement results at timings 0, $t$, $2t$, $3t$, $4t$, and $5t$ are respectively represented by $l_1$, $l_2$, $l_3$, $l_4$, $l_5$, and $l_6$, and are assumed to include no errors.

In this case, an integration result of the distance measurement results $l_1$, $l_2$, and $l_3$ corresponds to the area of a right-up hatched portion $S_1$, and an integration result of the distance measurement results $l_4$, $l_5$, and $l_6$, corresponds to the area of a right-up hatched portion $S_2$.

When the difference between the areas $S_1$ and $S_2$ (difference between integration outputs) is calculated, the area indicated by a right-down hatched portion $S_3$ on the area $S_1$ is calculated. The area $S_3$ serves as speed data.

More specifically, as shown in FIG. 6A, if $l_1=12$, $l_2=11$, $l_3=10$, $l_4=9$, $l_5=8$, $l_6=7$, and the object 110 approaches by a unit distance during a unit time t, the areas $S_1$ and $S_2$ are respectively given by:

$$S_1=10+11+12=33 \quad (1a)$$

$$S_2=7+8+9=24 \quad (2a)$$

Therefore, the area $S_3$ is calculated by:

$$S_3=S_1-S_{20}=9 \quad (3a)$$

From this result, since the difference between integration start timings of the areas $S_1$ and $S_2$ is $3t$, and the number of times of integrations is 3, the speed v can be calculated by:

$$v=S_3/3t\times 3=9/9t=1/t \quad (4a)$$

FIG. 6B shows a case wherein random noise components are superposed on distance measurement results $l'_1$, $l'_2$, $l'_3$, $l'_4$, $l'_5$, and $l'_6$ at timings 0, t, $2t$, $3t$, $4t$, and $5t$.

In this case, due to the noise canceling effect by integration, we have:

$$S'_3=S'_1-S'_2\approx S_3=9 \quad (5a)$$

For this reason, like in equation (4a), speed detection of an object whose position is changed by a unit distance in a unit time t can be attained independently of imprecision of the distance measurement results.

FIGS. 9A to 9D are timing charts associated with this integration operation.

An operation of a modification which allows speed detection with higher precision on the basis of basically the same concept as the distance measurement system using the difference between two integration outputs according to the second embodiment described above with reference to FIGS. 6A and 6B will be described below.

In particular, in a so-called active AF system, which performs a distance measurement by projecting light from the IRED onto an object, the S/N ratio is impaired as the object is separated by a farther distance, resulting in poor precision. For this reason, as shown in FIG. 6A, a large difference in precision appears in two integration results upon comparison between a case wherein an integration operation of a set of results $l_1$, $l_2$, and $l_3$ on the far distance side is performed, and a case wherein an integration operation of a set of results $l_4$, $l_5$, and and $l_6$ on the near distance side is performed.

In this modification, integration operations are performed while switching the first and second integration circuits 116 and 117 for every distance measurement operation, in such a manner that the first distance measurement result $l_1$ is integrated by the first integration circuit 116, the second distance measurement result $l_2$ is integrated by the second integration circuit 117, the third distance measurement result $l_3$ is integrated by the first integration circuit 116 again, . . . . In this manner, odd-numbered distance measurement results are integrated by the first integration circuit 116, and even-numbered distance measurement results are integrated by the second integration circuit 117, so that errors of the two integration results can be balanced.

FIGS. 7A to 7D show in detail timings between the above-mentioned distance measurement and integration operations.

More specifically, an integration operation 1 by the first integration circuit 116 and an integration operation 2 by the second integration circuit 117 are repeated for every distance measurement operation at the illustrated timings. In this case, as compared to the conventional speed detection apparatus (FIG. 23), since a process for calculating a distance can be omitted, the noise canceling effect by a larger number of times of integration operations can be expected when speed detection is performed for the same period of time. Since a change in object position in each distance measurement operation is initially taken into consideration, speed detection with remarkably high precision can be performed.

Upon completion of a series of distance measurement operations, the difference between the integration outputs from the first and second integration circuits 116 and 117 is calculated by the subtraction circuit 115, thus calculating speed data corresponding to the area $S_3$, as has been described above with reference to FIG. 6A. When speed data (area $S_3$) in this case is calculated according to equation (5a) described above, we have:

$$S_3=(12+10+8)-(11+9+7)=3 \quad (6a)$$

In this case, unlike in equation (4a), the difference between integration timings of the integration circuits and 117 is t. However, since the number of times of integration operations is 3, the finally obtained speed v is given by:

$$v=S_3/t\times 3=1/t \quad (7a)$$

Therefore, equation (7a) becomes the same as equation (4a), and the same results as in a case of FIG. 6A can be obtained.

The arrangement of the distance measurement optical system 112 is the same as that of the distance measurement optical system 12 in the first embodiment, and a detailed description thereof will be omitted.

Figure 8:
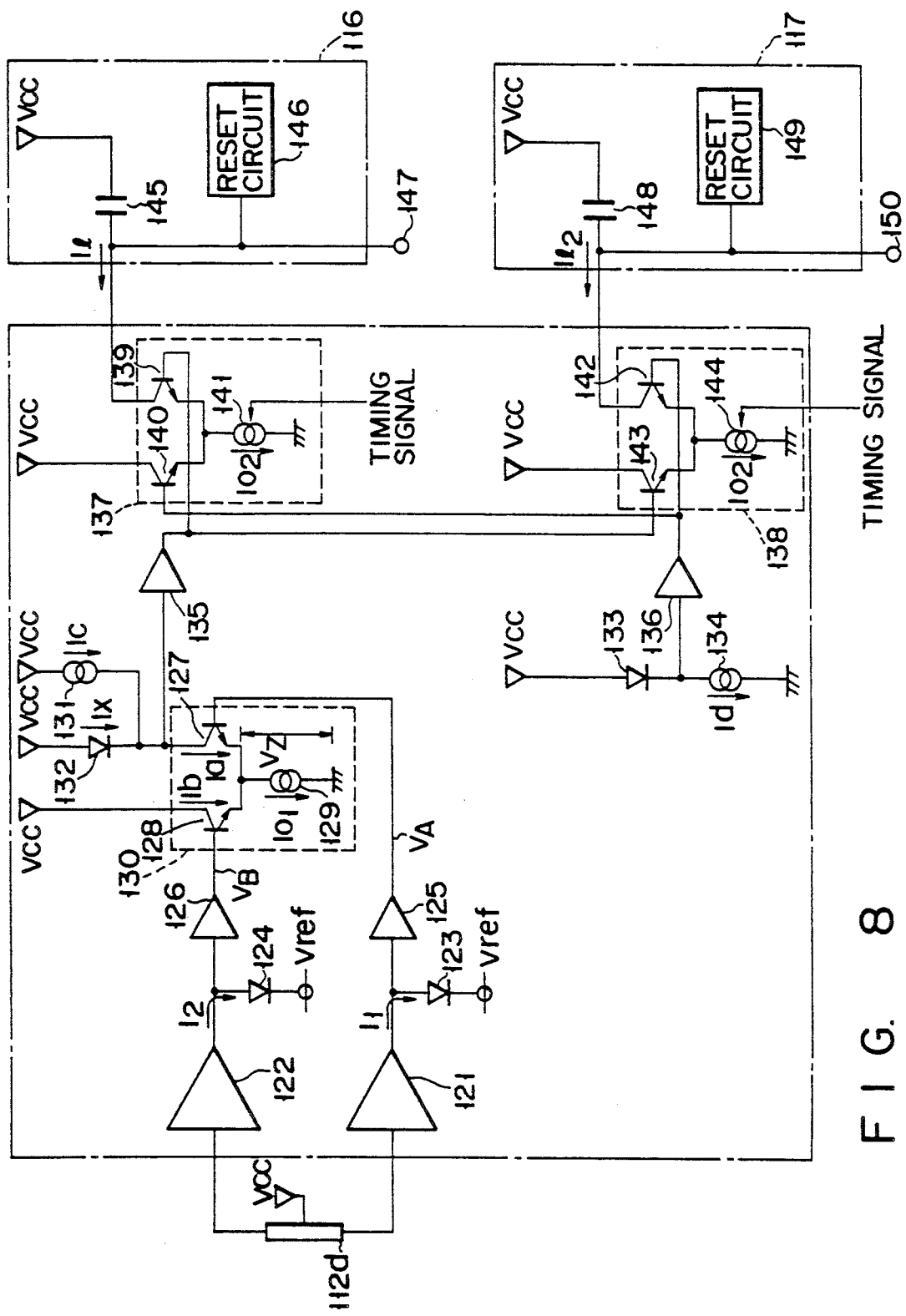
FIG. 8 is a detailed circuit diagram of a circuit for integrating distance data.
Figure 9:
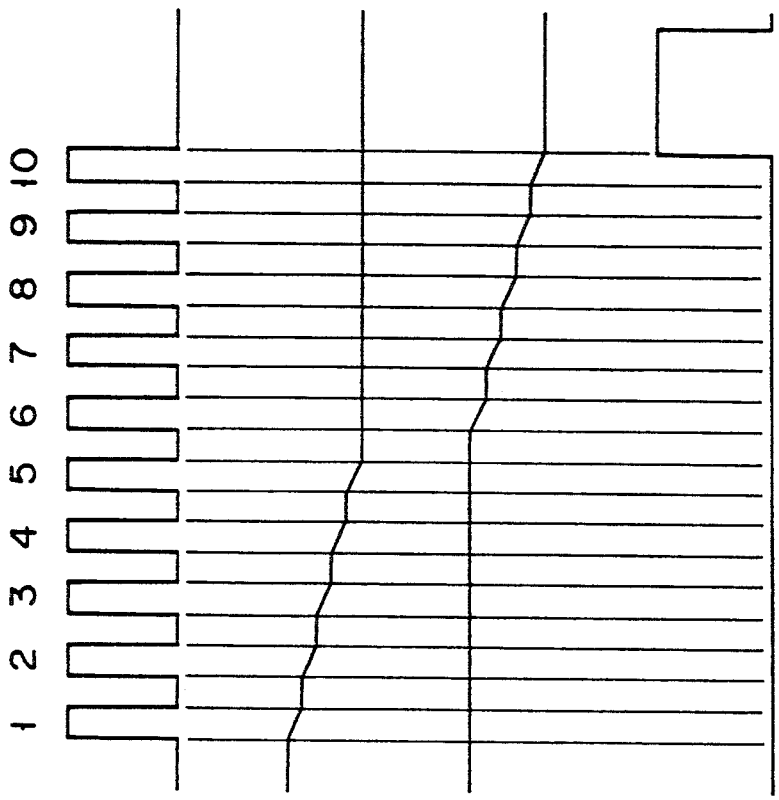
FIGS. 9A to 9D are timing charts showing operations executed when distance measurement results are separately integrated in two halved intervals.

FIG. 8 shows a detailed circuit arrangement for integrating distance data in the integration circuits and 117 using the output signals I₁ and I₂ from the PSD 112d. This circuit arrangement is similar to the arrangement shown in FIG. 4, and an output current Il from a differential calculation circuit 137 is obtained by equation (16) described above. However, in this embodiment, the differential calculation circuit 137 is a circuit for supplying a current signal according to an object distance l at the first timing to the integration circuit 116. When a current source 141 is turned on in response to a timing signal generated every time odd-numbered light emission of the IRED 112a is performed, a current Il depending on the object distance l is integrated by an integration capacitor 145 of the integration circuit 116.

The integration capacitor 145 is reset by a reset circuit 146 prior to light emission of the IRED 112a. For this reason, after the completion of a series of distance measurement operations, a signal corresponding to "12+8+10" with reference to, e.g., equation (6a), appears at an output terminal 147.

A differential calculation circuit 138 consisting of NPN transistors 142 and 143, and a current source 144 is a circuit for supplying a current signal according to an object distance at the second timing to the integration circuit 117. When the current source 144 is turned on in response to a timing signal generated every time even-numbered light emission of the IRED 112a is performed, a current Il₂ depending on the object distance l is integrated by an integration capacitor 148 of the integration circuit 117.

The current Il₂ at this time satisfies the following relation depending on the object distance l like in equation (16):

$$Il_2 = \frac{t_0 \cdot I_d \cdot I_{02}}{I_{01} \cdot S \cdot f} \cdot l \quad (8a)$$

The integration capacitor 148 is similarly reset by a reset circuit 149 prior to light emission of the IRED 112a. For this reason, upon completion of a series of distance measurement operations, a signal corresponding to "11+9+7" in, e.g., equation (6a), appears at an output terminal 150.

In this manner, upon completion of a plurality of times of distance measurement operations shown in FIGS. 7A to 7D, the subtraction circuit 115 calculates speed data S₃ in equation (6a) on the basis of the difference between the voltage signals appearing at the output terminals 147 and 150. Note that the speed data S₃ may be digitally calculated by A/D converting the integration outputs in the CPU 111, or may be calculated by an analog subtraction circuit comprising operational amplifiers.

The moving speed v of the object 110 is calculated on the basis of the speed data S₃ by software processing by the CPU 111, i.e., a calculation given by equation (7a). More specifically, when the voltage signals appearing at the output terminals 147 and 150 are respectively represented by $V_{OUT1}$ and $V_{OUT2}$, based on the speed v described above with reference to FIG. 6A, the object position l(t) is given by:

$$l(t) = -v \cdot t + l_1 \quad (9a)$$

Equations (16) and (8a) can be respectively expressed as:

$$Il = A \cdot l(t) = A(l_1 - v \cdot t) \quad (10a)$$

$$Il_2 = A \cdot l(t) = A(l_1 - V \cdot t) \quad (11a)$$

where A is a constant.

Therefore, if the capacitance of the integration capacitor 145 is represented by C, the voltage signal $V_{OUT1}$ is given by:

$$V_{OUT1} = \frac{1}{C}\int_0^T Il \cdot dt = \frac{A}{C}\left[l_1 t - \frac{1}{2}vt^2\right]_0^T \quad (12a)$$

$$\frac{A}{C}\left[l_1 T - \frac{1}{2}vT^2\right]$$

where T is the integration time.

Since the voltage $V_{OUT2}$ is a result obtained by shifting a timing by $\Delta t$ from the voltage signal $V_{OUT1}$, and performing an integration for the time T, it is given by:

$$V_{OUT2} = \frac{1}{C}\int_{\Delta t}^{T+\Delta t} Il_2 \cdot dt \quad (13a)$$

$$= \frac{A}{C}\left[l_1(T+\Delta t) - \frac{v}{2}(T+\Delta t)^2 - l_1\Delta t + \frac{v}{2}\Delta t^2\right]$$

Thus, a difference $\Delta V_{OUT}$ between the two voltage signals $V_{OUT1}$ and $V_{OUT2}$ is given by:

$$\Delta V_{OUT} = V_{OUT2} - V_{OUT1} \quad (14a)$$

$$= \frac{A}{C}\left(l_1 T + l_1 \Delta t - \frac{1}{2}vT^2 - \frac{1}{2}v\Delta T^2 - \right.$$

$$\left. v\Delta tT - l_1 t + \frac{1}{2}v\Delta t^2 - l_1 T + \frac{1}{2}vT^2\right)$$

$$= -\frac{A}{C} \cdot v \cdot \Delta t$$

$$\therefore v = -\frac{\Delta V_{OUT} \times C}{A \cdot \Delta t \cdot T} = D \cdot \Delta V_{OUT} \quad (15a)$$

where D is a constant.

As described above, the speed v can be easily calculated using the difference $\Delta V_{OUT}$ between the two integration outputs $V_{OUT1}$ and $\Delta V_{OUT2}$.

As described above, according to the second embodiment of the present invention, the moving speed of an object is calculated using the first and second integration outputs associated with a plurality of times of distance measurement operations.

More specifically, the moving speed of the object is calculated based on the difference between the first and second integration outputs obtained by integrating a plurality of distance measurement results. In this embodiment, the first and second integration operations for integrating distance measurement results based on light emission of the IRED are alternately performed for every light emission of the IRED. Thus, the noise canceling effect by a large number of times of integration operations can be expected, and a difference in precision appearing in the two integration results can be minimized. Since a series of operations, i.e., distance measurements and integrations are attained by analog calculations which can be instantaneously completed, high-speed processing can be performed. Therefore, high-precision, high-speed detection can be realized by a simple arrangement.

In the above embodiment, the reset circuits are respectively provided to the first and second integration circuits. However, the present invention is not limited to this. For example, the two integration circuits can commonly use one reset circuit.

Note that the distance l need not always be calculated like in this embodiment, but 1/distance (1/l) may be calculated, and may be used as a distance measurement result.

FIG. 10 shows a schematic arrangement of an object moving speed detection apparatus according to the third embodiment of the present invention.

More specifically, a CPU 211 controls the overall apparatus, and is connected to a timing circuit 213, a distance calculation circuit (AF circuit) 214, and a subtraction circuit 215. Parallel circuits of a switch SW3 and a first integration circuit 216, and of a switch SW4 and a second integration circuit 217 are connected between the distance calculation circuit 214 and the subtraction circuit 215.

The timing circuit 213 operates the distance calculation circuit 214, the switches SW3 and SW4, and a driver 218 under the control of the CPU 211.

The driver 218 drives an infrared light-emitting diode (IRED) 212a included in a distance measurement optical system 212 in accordance with an instruction from the timing circuit 213.

The distance measurement optical system 212 comprises the IRED 212a, a projection lens 212b for projecting light (infrared light signal) from the IRED 212a toward an object 210, a light-receiving lens 212c for receiving light reflected by the object 210, and an optical position detection element (PSD) 212d for generating signal currents $I_1$ and $I_2$ according to an incident position of the reflected signal light received by the light-receiving lens 212c.

The distance calculation circuit 214 extracts a signal light component from an output signal, i.e., steady light components of the PSD 212d based on light emission of the IRED 212a in accordance with an instruction from the timing circuit 213, and calculates it in an analog manner, thus obtaining a distance l to the object 210.

The first integration circuit 216 sequentially integrates distance measurement results of the distance calculation circuit 214, which results are supplied when the switch SW3 is turned on (closed) according to an instruction from the timing circuit 213.

The second integration circuit 217 sequentially integrates distance measurement results of the distance calculation circuit 214, which results are supplied when the switch SW4 is turned on (closed) according to an instruction from the timing circuit 213.

The subtraction circuit 215 calculates the difference between integration outputs supplied from the first and second integration circuits 216 and 217.

The CPU 211 calculates a moving speed of the object 210 in the optical axis direction on the basis of an output from the subtraction circuit 215. Thereafter, a taking lens 218 is moved to an in-focus position by the above-mentioned method on the basis of the calculated moving speed.

The CPU 211 sets a time interval between distance measurement operations, or the number of times of distance measurement operations in the timing circuit 213 on the basis of the first distance calculation output (distance measurement result) supplied from the distance calculation circuit 214. More specifically, the CPU 211 varies a light emission interval or the number of times of light emissions of the IRED 212a in accordance with the distance l to the object 210, and controls integration timings (switching timings of the switches SW3 and SW4) of the first and second integration circuits 216 and 217 in synchronism with the light-emission operation.

The concept for varying a time interval between distance measurement operations or the number of times of the distance measurement operations according to the present invention will be described below.

When distance measurement operations are performed at insufficient time intervals, the light amount of signal light is decreased due to heating of the IRED.

In general, in an active-type distance measurement apparatus, as an object is separated by a farther distance, precision suffers from more serious degradation under the influence of the amount of projected light, and circuit noise or external light noise. In contrast to this, for an object at a near distance, since the amount of projected signal light can be smaller than that for a far distance, a small decrease in light amount does not pose a problem. Contrary to this, it is effective as a countermeasure against the above-mentioned time lag to shorten a time interval between distance measurement operations. For this reason, for an object at a near distance, the time lag has priority over the light amount. More specifically, a time interval between distance measurement operations is shortened to perform speed detection.

When the number of times of distance measurement operations is increased, this leads to prevention of degradation of the S/N ratio for an object at a far distance, as described above. For the same reason as for the time interval between distance measurement operations, a sufficient S/N ratio can be obtained for an object at a near distance, and distance measurement operations need not be repeated to improve precision. Therefore, for an object at a near distance, an importance can be placed on shortening of the time lag rather than an improvement of the S/N ratio by an increase in number of times of distance measurement operations. For an object at a near distance, the number of times of distance measurement operations is decreased to perform speed detection.

The IRED 212a emits light a plurality of times in accordance with a time interval or the number of times set in the timing circuit 213 based on the above-mentioned concept. Every time the IRED emits light, the object distance l is calculated, and its integration output is obtained. Therefore, more effective speed detection for an object at a near distance can be performed.

The integration results obtained by the integration operations of the first and second integration circuits 216 and 217 are the same as those in the description of FIGS. 6A and 6B, and a description thereof will be omitted. Differences between this embodiment and the second embodiment are as follows. That is, the time interval t in FIGS. 6A and 6B is changed in accordance with the first object distance $l_1$ to vary a time interval between distance measurement operations. In addition, the number of distance measurement operations (6 in FIGS. 6A and 6B) is changed in accordance with the first object distance $l_1$ to vary the number of times of distance measurement operations.

The timings of the distance measurement and integration operations of this embodiment are the same as those in the description of FIGS. 7A to 7D. The integration operations 1 and 2 of this embodiment are performed in such a manner that every time the IRED 212a emits light, ON/OFF states of the switches SW3 and SW4 are controlled by the timing circuit 213, and distance measurement results from the distance calculation circuit 214 are supplied to the integration circuits 216 and 217 in turn.

Since the arrangement of the distance measurement optical system 212 is the same as that of the distance measurement optical system 12 shown in FIG. 1, a detailed description thereof will be omitted.

The arrangements of the distance calculation circuit 214, and the first and second integration circuits 216 and 217 are the same as those shown in FIG. 8, and an output current Il of a differential calculation circuit can be obtained based on the above-mentioned equation. However, the differential calculation circuit of this embodiment is a circuit (SW3) for supplying a current signal corresponding to an object distance l at the first timing to the integration circuit 216. When a current source is turned on in response to a timing signal from the timing circuit 213 every time odd-numbered light emission of the IRED 212a is performed, a current Il depending on the object distance l is integrated by an integration capacitor of the integration circuit 216.

In this embodiment, the object speed v is calculated by equation (15a). Thereafter, a lens adjustment position l is calculated by an equation given by $l = ln - v \cdot t$ (where ln is the last distance measurement value, and T is the time (predetermined value) from the last distance measurement timing to the beginning of exposure).

Operations for varying a time interval between distance measurement operations or the number of times of the distance measurement operations will be described.

Figure 11:
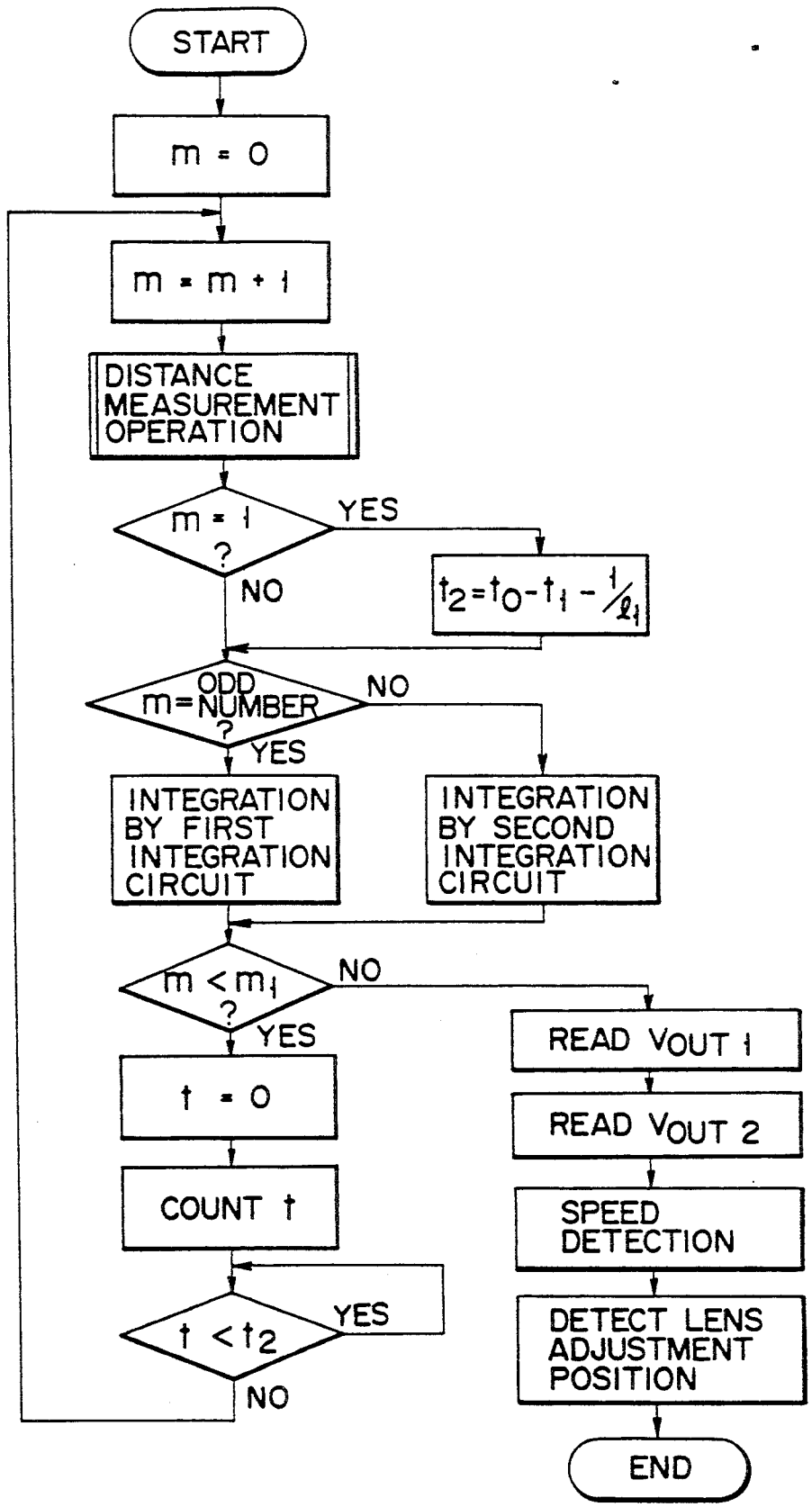
FIG. 11 is a flow chart for explaining an operation executed when a time interval between distance measurement operations is varied.

FIG. 11 is a flow chart for shortening a time interval between distance measurement operations for an object at a near distance. This flow chart has steps of determining timings of second and subsequent distance measurement operations on the basis of the first distance measurement result $l_1$.

More specifically, based on the first distance measurement result $l_1$, a time interval $t_2$ between distance measurement operations is determined according to the following relation:

$$t_2 = t_0 - t_1 \cdot 1/l_1 \qquad (1b)$$

In this case, as the object distance l is smaller, the time interval t2 becomes shorter.

When the IRED 212a may be considered to be destructed by heat, a power control circuit for decreasing a drive current of the IRED 212a according to the time interval $t_2$ may be arranged to avoid destruction.

FIG. 12 is a flow chart for decreasing the number of times of distance measurement operations to shorten a time lag for an object at a near distance. In this case, the number of times of distance measurement operations is determined by the first distance measurement result $l_1$.

In general, in an active-type distance measurement apparatus, its S/N ratio can be expressed by:

$$S/N \propto 1/l^2 \qquad (2b)$$

where l is the object distance.

The noise canceling effect has the following relation with the number of times n of distance measurement operations:

$$S/N \propto \sqrt{n} \qquad (3b)$$

Therefore, when the number of times n of distance measurement operations is set as follows according to the first distance measurement result $l_1$, the S/N rations at the respective distances can be equalized:

$$n = n_0 \cdot l_1^2 \qquad (4b)$$

Note that calculations of equations (3b) and (4b) are performed by, e.g., the CPU 211.

The value D in a speed detection calculation formula given by equation (15a) is changed in consideration of the above-mentioned results.

As described above, according to the third embodiment of the present invention, when the moving speed of an object is obtained based on integration outputs associated with a plurality of times of distance measurement operations, a time interval between distance measurement operations or the number of times of distance measurement operations can be changed in accordance with an object distance.

More specifically, a time interval between distance measurement operations or the number of times of distance measurement operations is changed in accordance with the first distance measurement result, and the moving speed of the object is obtained based on the difference between the first and second integration outputs obtained by integrating distance measurement results. Processing resistive against noise can be performed within a short period of time, and the influence of a time lag which poses a problem in distance measurement of an object at a near distance can be eliminated. Therefore, high-precision, high-speed speed detection can be realized by a simple arrangement.

When the present invention is applied to an autofocus photographing apparatus for a camera, an apparatus which does not easily cause defocusing, and is very easy to use, can be provided.

In the above embodiment, the reset circuits are respectively provided to the first and second integration circuits. However, the present invention is not limited to this. For example, the two integration circuits can commonly use one reset circuit.

The present invention is not limited to an arrangement for obtaining speed data based on the difference between outputs from the two integration circuits. For example, the present invention is applicable to an arrangement for obtaining speed data based on an output from one integration circuit.

Note that 1/distance (1/l) may be calculated in place of a distance l, and may be used as a distance measurement result.

Furthermore, a light emission interval or the number of times of projections is varied on the basis of the first distance measurement result. However, the present invention is not limited to this. For example, the light emission interval or the number of times of projections may be varied on the basis of a plurality of initial distance measurement results.

The fourth embodiment of the present invention will be described below with reference to the accompanying drawings.

Figure 13:
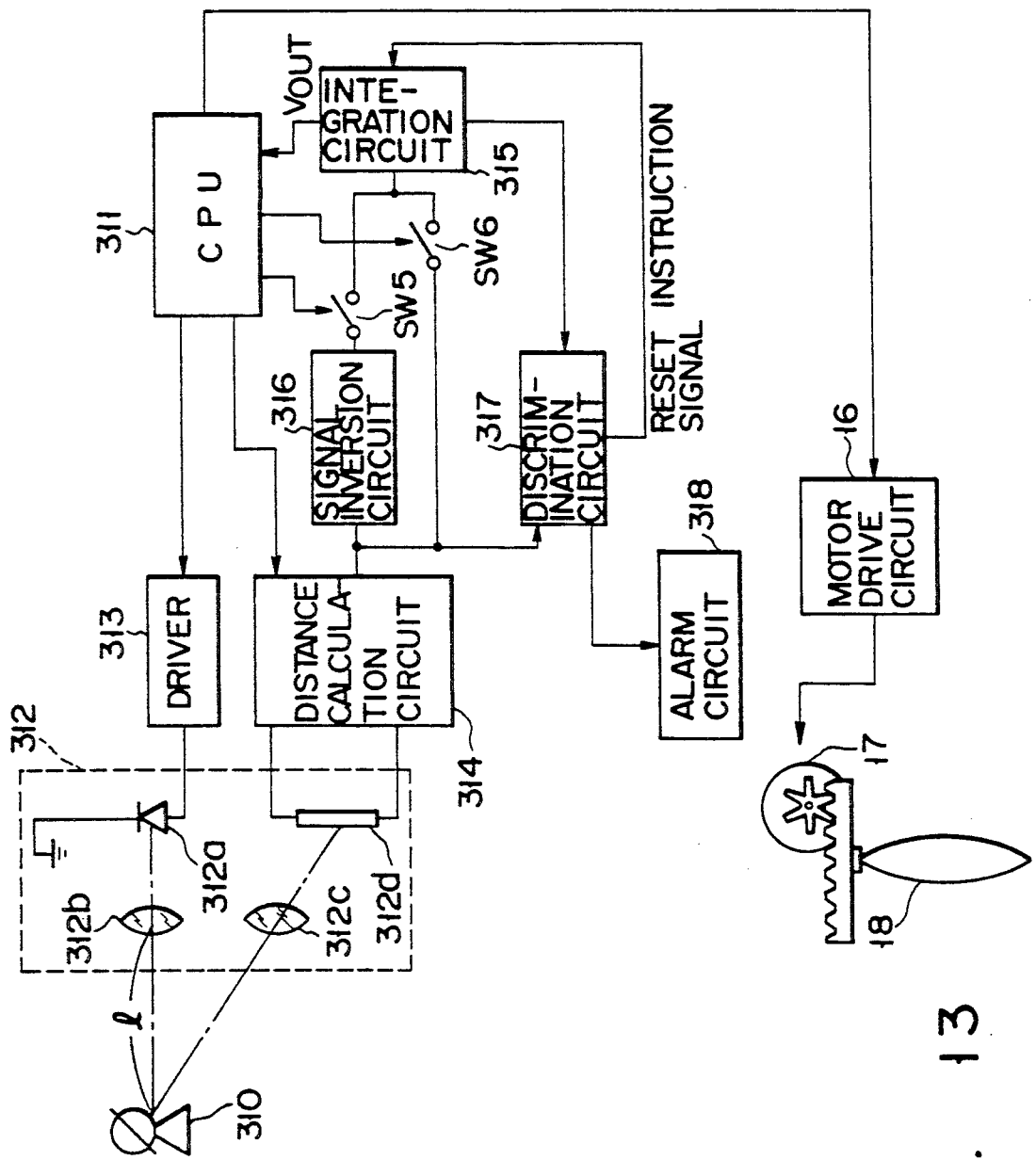
FIG. 13 is a schematic block diagram showing an arrangement of a speed detection apparatus according to the fourth embodiment of the present invention.

FIG. 13 shows a schematic arrangement of an object moving speed detection apparatus according to the present invention.

More specifically, a CPU 311 controls the overall apparatus, and is connected to a driver 313, a distance calculation circuit (AF circuit) 314, an integration circuit 315, and the like. Parallel circuits of switches SW5 and SW6 whose ON/OFF states are controlled by the CPU 311, and a signal inversion circuit 316 connected in series with the switch SW6 are arranged between the distance calculation circuit 314 and the integration circuit 315.

Furthermore, the object moving speed detection apparatus comprises a discrimination circuit 317 for discriminating whether or not an output (distance data) from the distance calculation circuit 314 or an output (speed data) from the integration circuit 315 is suitable for the subsequent speed detection, and an alarm circuit 318 for, when the circuit 317 discriminates that the data is not suitable for the speed detection, generating an alarm signal.

The driver 313 drives an infrared light-emitting diode (IRED) 312a included in a distance measurement optical system 312, and causes the IRED 312a to emit light at given time intervals under the control of the CPU 311.

The distance measurement optical system 312 comprises the IRED 312a, a projection lens 312b for projecting light (infrared light signal) from the IRED 312a toward an object 310, a light-receiving lens 312c for receiving light reflected by the object 310, and an optical position detection element (PSD) 312d for generating signal currents $I_1$ and $I_2$ according to an incident position of the reflected signal light received by the light-receiving lens 312c.

The distance calculation circuit 314 extracts a signal light component from an output signal, i.e., steady light components of the PSD 312d based on light emission of the IRED 312a under the control of the CPU 311, and calculates it in an analog manner, thus obtaining a distance l to the object 310.

The integration circuit 315 sequentially integrates distance measurement results from the distance calculation circuit 314. When the switch SW5 is turned on under the control of the CPU 311, the integration circuit 315 positively integrates the distance measurement results, and when the switch SW6 is turned on, it negatively integrates the distance measurement results, that is, it positively integrates the distance measurement results supplied through the signal inversion circuit 316.

The discrimination circuit 317 performs a fardistance discrimination, i.e., discriminates a case wherein a distance measurement result (distance data) from the distance calculation circuit 314 indicates too far a distance to be used in speed calculations, and performs a high-speed discrimination, i.e., discriminates a case wherein an integration result (speed data) from the integration circuit 315 indicates an extremely high speed or suggests possibility of noise mixing. When the discrimination circuit 317 discriminates these cases, it outputs an instruction for resetting the integration operation in the integration circuit 315. When the integration operation is reset, the discrimination circuit 317 outputs an instruction for causing the alarm circuit 318 to generate an alarm signal.

The CPU 311 controls drive timings of the driver 313 and the distance calculation circuit 314, and calculates a moving speed of the object 310 in the optical axis direction on the basis of an output $V_{OUT}$ from the integration circuit 315. Thereafter a taking lens 318 is moved to an in-focus position by the above-mentioned method on the basis of the calculated moving speed.

The CPU 311 controls integration timings (switching timings of the switches SW5 and SW6) of the integration circuit 315. More specifically, every time the CPU 311 causes the IRED 312a to emit light via the driver 313, it controls ON/OFF states of the switches SW5 and SW6.

In this embodiment, the switches SW5 and SW6 are alternately turned on/off so as to perform positive or negative integration by one integration circuit 315. More specifically, in this embodiment, for example, the integration direction of the integration circuit is switched in every distance measurement operation, in such a manner that a first distance measurement result $l_1$ is supplied to the integration circuit 315 so as to obtain a positive integration output, a second distance measurement result $l_2$ is inverted, and the inverted signal is supplied to the integration circuit 315 so as to obtain a negative integration output, a third distance measurement result $l_3$ is supplied to the integration circuit 315 so as to obtain a positive integration result again . . . . In this manner, the odd-numbered distance measurement results are, for example, positively integrated, and even-numbered distance measurement results are negatively integrated, thereby finally obtaining a signal based on speed data.

When the integration direction is switched, another integration circuit need not be prepared to store two integration results, i.e., areas $S_1$ and $S_2$, and the same calculation as in equation (4a) described above can be performed by a single integration circuit.

Figure 14:
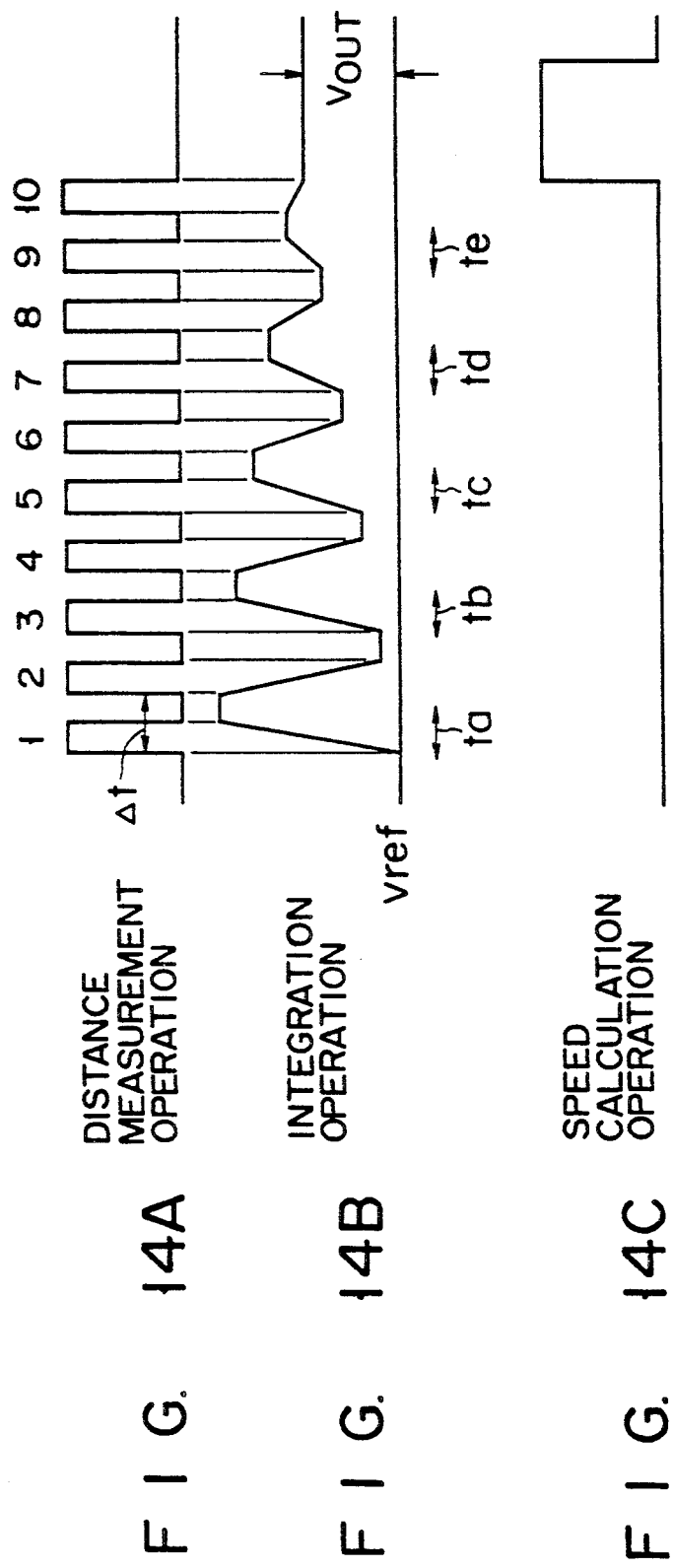
FIGS. 14A to 14C are timing charts for explaining an integration operation according to the fourth embodiment.

FIGS. 14A to 14C show in detail timings of distance measurement and integration operations according to the present invention.

More specifically, every time a distance measurement operation is performed, the positive and negative integration operations of the integration circuit 315 as shown in FIGS. 14A to 14C, upon completion of the even-numbered integration operation, a signal based on speed data is output as the integration output $V_{OUT}$.

This speed calculation operation will be described below following the case of FIGS. 6A and 6B described above. In this case, a speed v is given by the following equation, and the same result as that of equation (4a) can be obtained:

$$v = (l_1 - l_2 + l_3 - l_4 + l_5 - l_6)/t \quad (1c)$$
$$= 1/t$$

Figure 23:
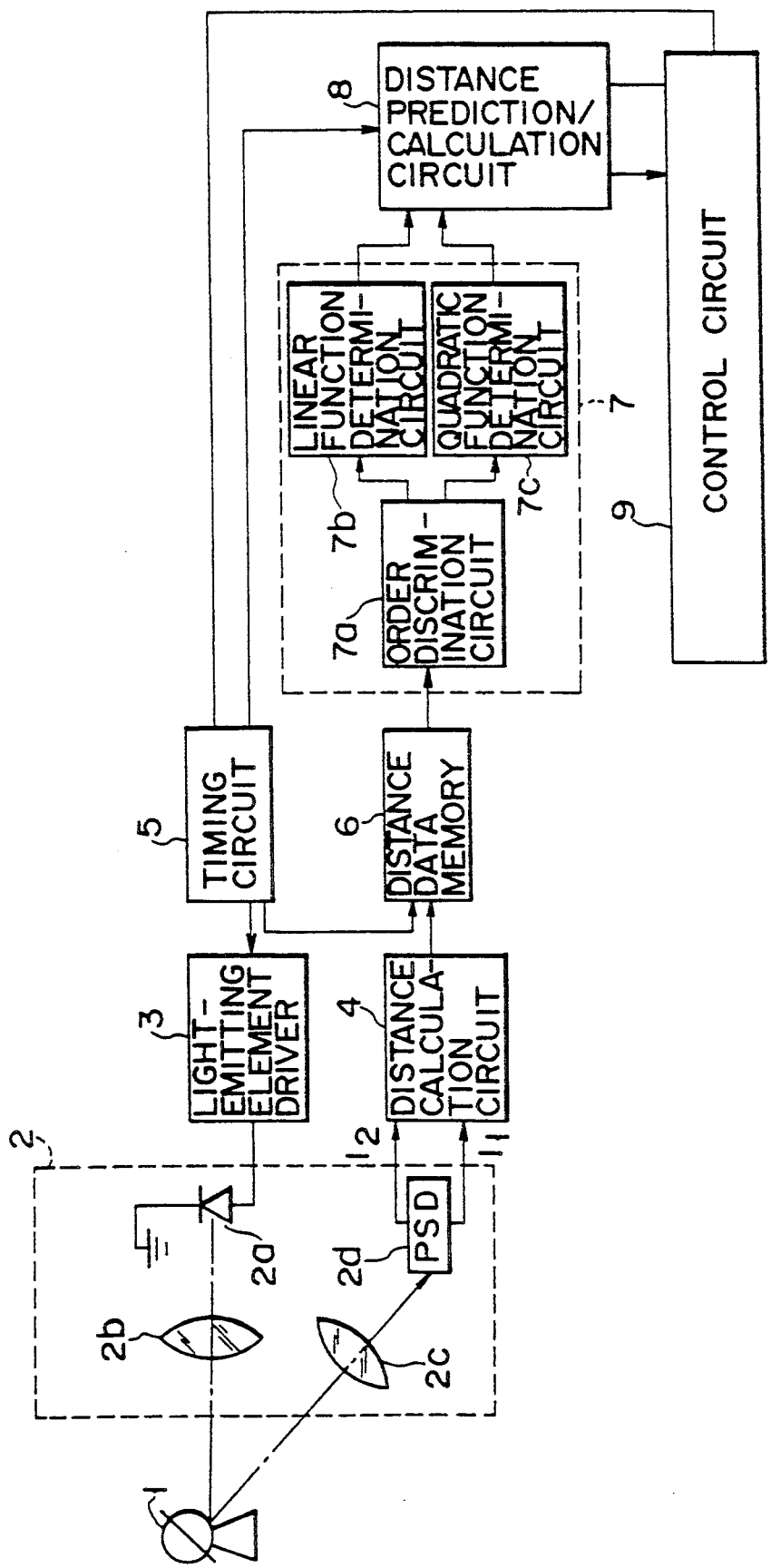
FIG. 23 is a block diagram showing an arrangement of a conventional speed detection apparatus.
Figure 24:
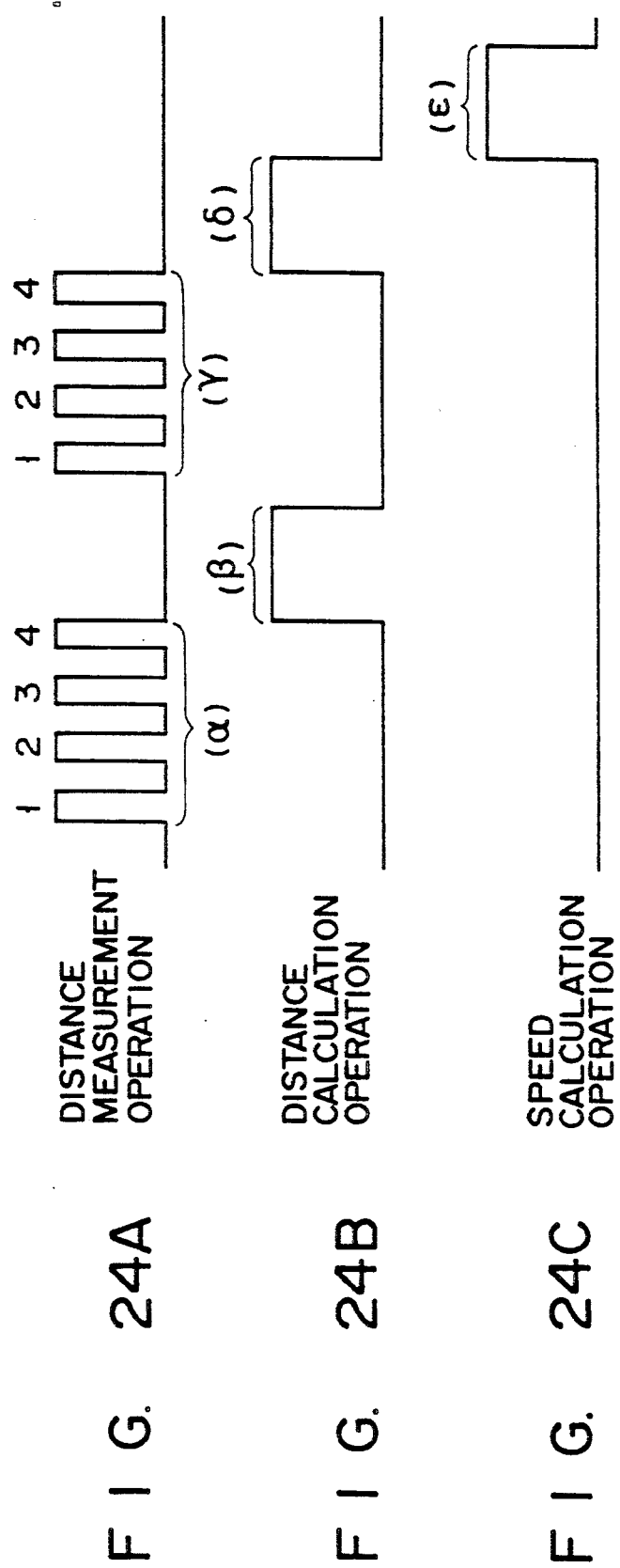
FIGS. 24A to 24C are timing charts for explaining an operation of the apparatus shown in FIG. 23.
Figure 25:
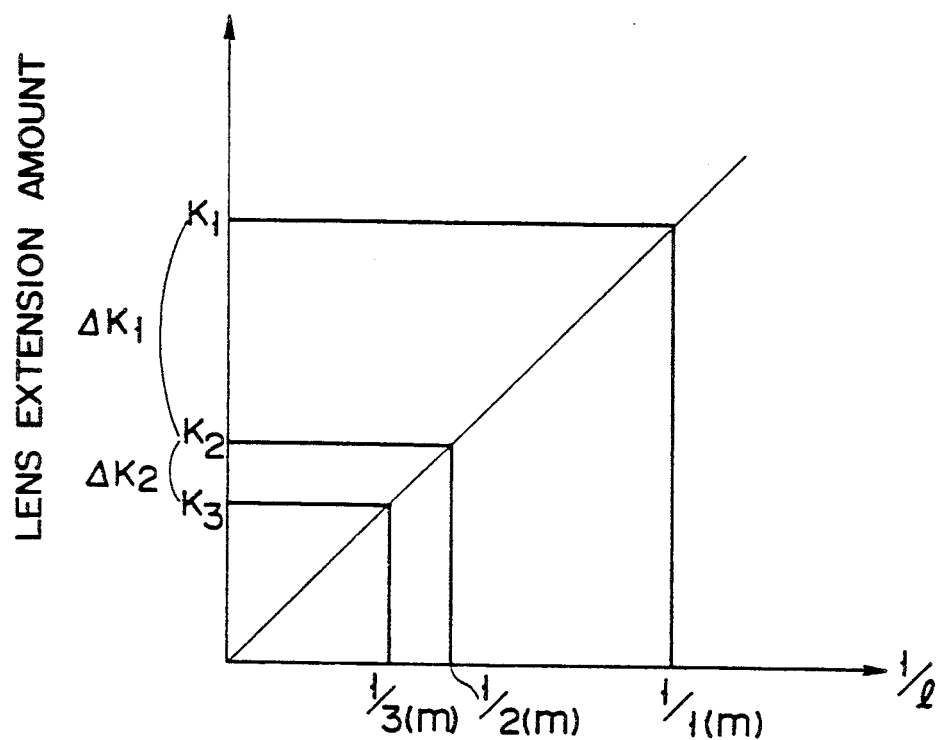
FIG. 25 is a graph showing the relationship between an object distance and a lens extension amount of a normal taking lens.

According to this method, a process for calculating a distance can be omitted as compared to the conventional speed detection apparatus (FIG. 23). Therefore, when speed detection is performed within a predetermined period of time, the noise canceling effect by a larger number of times of integrations can be expected. Since a change in object position in every distance measurement operation is initially taken into consideration, speed detection with remarkably high precision can be performed.

The above-mentioned integration operation will be described in detail below with reference to FIG. 13.

More specifically, every time the CPU 311 causes the IRED 312a to emit light via the driver 313, it controls the ON/OFF states of the switches SW5 and SW6, and a calculation output from the distance calculation circuit 314 is supplied to the integration circuit 315. In this case, a distance measurement result for even-numbered light emission is input to the integration circuit 315 via the signal inversion circuit 316 to be subjected to an integration operation in a direction opposite to that of a distance measurement result for odd-numbered light emission. With this arrangement, a positive/negative integration operation can be realized by the single integration circuit 315.

Since the distance measurement optical system 312 has the same arrangement as that of the distance measurement optical system 12 described above, a detailed description thereof will be omitted.

Figure 15:
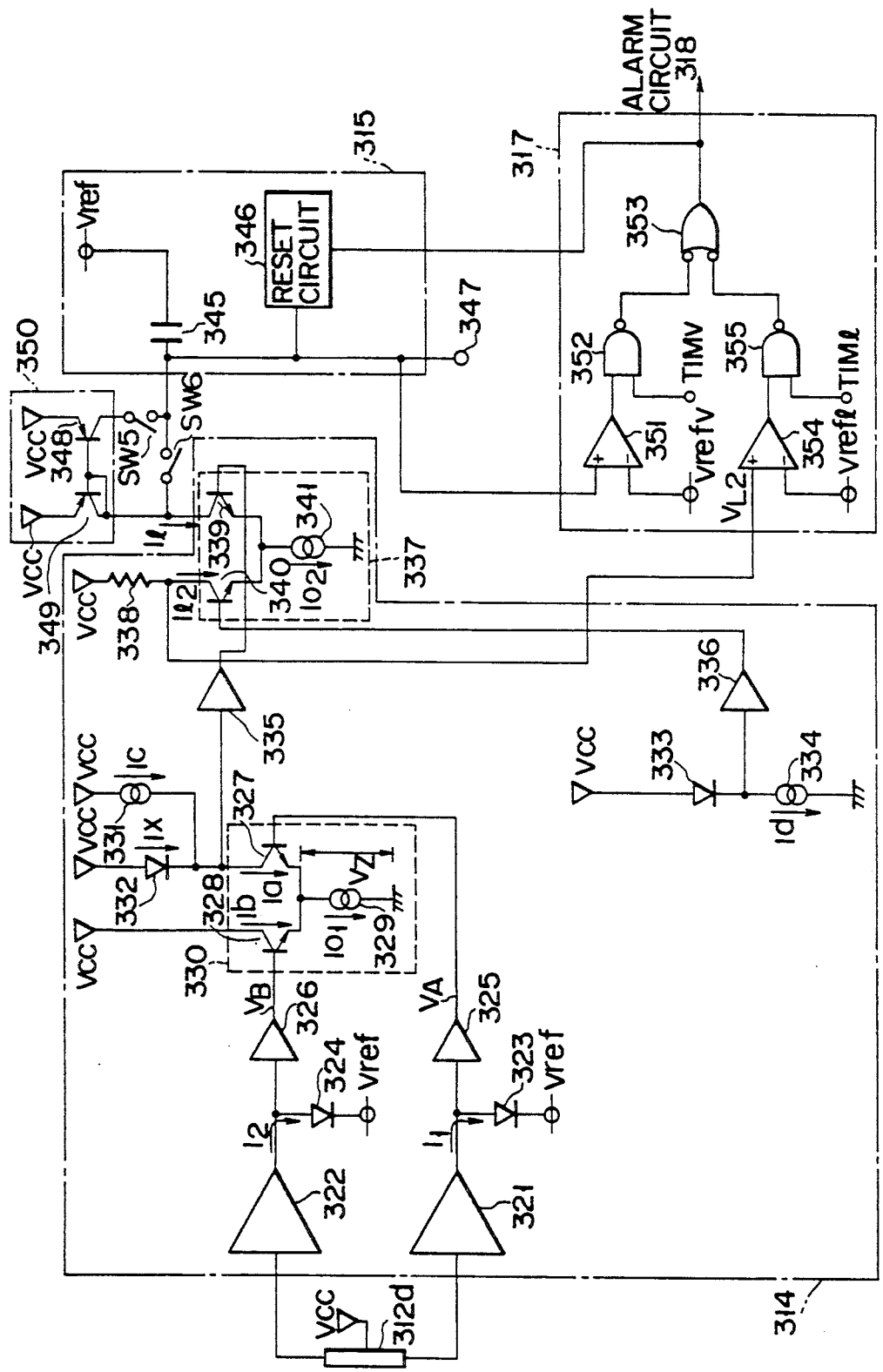
FIG. 15 is a detailed circuit diagram of a circuit for integrating distance data.

FIG. 15 shows a detailed circuit arrangement for integrating distance data by the integration circuit 315 using the output signals $I_1$ and $I_2$ from the PSD 312d.

More specifically, when the switch SW5 or SW6 is turned on in response to a timing signal generated every time the IRED 312a emits light, a current Il depending on an object distance l is integrated by an integration capacitor 345 of the integration circuit 315.

As described above, the switches SW5 and SW6 are sequentially switched in synchronism with light emission of the IRED 312a. For example, upon odd-numbered light emission of the IRED 312a, the switch SW5 is turned on, and the switch SW6 is turned off. Upon even-numbered light emission of the IRED 312a, the switch SW6 is turned on, and the switch SW5 is turned off. Furthermore, when the IRED 312a does not emit light, both the switches SW5 and SW6 are turned off. The integration capacitor 345 is reset to an initial state upon operation of a result circuit 346 prior to the light emission of the IRED 312a. For this reason, when the light emission of the IRED 312a is started, the switch SW5 is turned on upon odd-numbered light emission of the IRED 312a, and a signal current Il depending on the object distance l flows into the integration capacitor 345. In this manner, as shown in FIGS. 14A to 14C, an output from an output terminal 347 changes in the "+" direction.

On the other hand, upon even-numbered light emission of the IRED 312a, the switch SW6 is turned on, and a signal current Il depending on the object distance l flows out from the integration capacitor 345 upon operation of a current mirror circuit 350 comprising PNP transistors 348 and 349. In this case, the output from the output terminal 347 changes in the "−" direction, as shown in FIGS. 14A to 14C. In this case, the flow direction of the signal current Il is switched according to the ON/OFF states of the switches SW5 and SW6, so that the current mirror circuit 350 serves as the signal inversion circuit 316 shown in FIG. 13.

From FIG. 6A, an object position l(t) is given by the following equation based on the speed v:

$$l(t) = -v \cdot t + l_1 \tag{2c}$$

From equations (16) and (2c), the current Il can be expressed as:

$$\begin{aligned} Il &= A \cdot l(t) \\ &= A(l_1 - v \cdot t) \end{aligned} \tag{3c}$$

where A is a constant.

Therefore, when the capacitance of the integration capacitor 345 is represented by C, a logic formula for obtaining the speed v by the above-mentioned method is as follows.

An integration value obtained by alternately repeating positive and negative integration operations with reference to Vref is output to the output terminal 347. In this case, for the sake of easy understanding, a integration voltage value of integration in the positive direction, i.e., positive integration is obtained as $V_{OUT1}$ as follows:

$$\begin{aligned} V_{OUT1} &= \frac{1}{C} \int_0^T Il \cdot dt \\ &= \frac{A}{C} \left[ l_1 t - \frac{1}{2} v t^2 \right]_0^t \\ &= \frac{A}{C} \left[ l_1 T - \frac{1}{2} v T^2 \right] \end{aligned} \tag{4c}$$

where T is the sum of integration times ta to te.

When an integration voltage value of integration in the negative direction, i.e., negative integration is obtained as $V_{OUT2}$, since its integration time is T like in the voltage $V_{OUT1}$, and its timing is offset by $\Delta t$ from the voltage $V_{OUT1}$, $V_{OUT2}$ can be expressed as:

$$\begin{aligned} V_{OUT2} &= \frac{1}{C} \int_{\Delta t}^{T + \Delta t} Il \cdot dt \\ &= \frac{A}{C} \left[ l_1(T + \Delta t) - \frac{v}{2}(T + \Delta t)^2 - l_1 \Delta t + \frac{v}{2} \Delta t^2 \right] \end{aligned} \tag{5c}$$

The difference between the voltage values $V_{OUT1}$ and $V_{OUT2}$ is output to the output terminal 347, and the integration voltage $V_{OUT}$ is given by:

$$\begin{aligned} V_{OUT} &= V_{OUT1} - V_{OUT2} \\ &= \frac{A}{C} \cdot v \cdot \Delta t \cdot T \end{aligned} \tag{6c}$$

Therefore, from this result, the speed v is given by:

$$v = \frac{V_{OUT} \times C}{A \cdot \Delta t \cdot T} = D \cdot V_{OUT} \tag{7c}$$

where D is a constant.

As described above, the speed v can be easily calculated based on the integration output $V_{OUT}$ as speed data finally appearing at the output terminal 347.

In this manner, after an even-numbered distance measurement operation, an integration result as speed data always appears at the output terminal 347. Therefore, whether or not a speed is too high is discriminated based on the voltage $V_{OUT}$ appearing at the output terminal 347, thereby performing the above-mentioned high-speed discrimination.

More specifically, the voltage $V_{OUT}$ is supplied to the discrimination circuit 317, and is input to the positive terminal of a comparator 351. The negative terminal of the comparator 351 receives a reference voltage Vrefv for high-speed discrimination. In this case, as shown in equation (6c), as the integration time T is prolonged while the speed v remains the same, the voltage $V_{OUT}$ is increased. For this reason, as the integration time T is prolonged, the reference voltage Vrefv must be increased.

The output from the comparator 351 is supplied to one input terminal of a gate 352 constituting a timing circuit. The other input terminal of the gate 352 receives a timing signal T1Mv. Thus, at the end timing of the even-numbered distance measurement operation, the gate 352 is enabled, and an output (L/H) according to an output (H/L) from the comparator 351 is output to a NOR gate 353.

On the other hand, a current Il₂ flowing through a resistor 338 in each integration operation is discriminated, thus performing the above-mentioned far-distance discrimination. In this case, the current Il₂ flowing through the resistor 338 satisfies the following relation, and is decreased when a distance to the object 310 is too far:

$$Il_2 = I_{02} - Il = I_{02} - A \cdot l \tag{8c}$$

Therefore, in the far-distance discrimination, the magnitude of the current Il₂ is discriminated.

More specifically, a voltage $V_{L2}$ according to a voltage drop level of the resistor 338 caused by the 317, and is input to the positive terminal of a comparator 354. The negative terminal of the comparator 354 receives a reference voltage Vrefl for far-distance discrimination.

The output from the comparator 354 is supplied to one input terminal of a gate 355 constituting the timing circuit. The other input terminal of the gate 355 receives a timing signal TIMl. Upon an end timing of each distance measurement operation, the gate 355 is enabled, and an output (L/H signal) according to an output (H/L signal) from the comparator 354 is output to the NOR gate 353.

When an L signal is output from one of the gates 352 and 355, the NOR gate 353 outputs a reset instruction signal for initializing the integration capacitor 345. More specifically, when the voltage $V_{OUT}$ exceeds the high-speed reference voltage Vrefv, and the comparator 351 outputs an H signal based on the high-speed discrimination, or when the input voltage $V_{L2}$ exceeds the far-distance reference voltage Vrefl, and the comparator 354 outputs an H signal based on the far-distance discrimination, an L signal from the gate 352 or 355 based on the output from the comparator 354 is converted to an H signal, and the H signal is output to the reset signal 346. This H signal is also supplied to the alarm circuit 318. Thus, the alarm circuit 318 performs an alarm operation.

Note that the H signal from the NOR gate 353 may be discriminated by the CPU 311 to control an alarm operation of the alarm circuit 318.

FIGS. 16A to 16G show a reset operation by the above-mentioned arrangement.

More specifically, assume that the input voltage $V_{L2}$ exceeds the far-distance reference voltage Vrefl in, e.g., the second distance measurement operation, and the comparator 354 outputs an H signal. Thus, the gate 355 outputs an L signal, and the NOR gate 353 outputs an H signal in response to the L signal. Therefore, the reset circuit 346 is operated to initialize the integration capacitor 345, and the output $V_{OUT}$ from the integration circuit 315 is reset. According to this reset operation, the alarm circuit 318 performs an alarm operation.

Similarly, when an over-speed state of the object 310 is detected in, e.g., the sixth distance measurement result, the voltage $V_{OUT}$ exceeds the high-speed reference voltage Vrefv, and the comparator 351 outputs an H signal. Thus, the gate 352 outputs an L signal, and the NOR gate 353 outputs an H signal accordingly. Therefore, the reset circuit 346 is operated to initialize the integration capacitor 345, thereby resetting the output $V_{OUT}$ from the integration circuit 315. According to this reset operation, the alarm circuit 318 performs an alarm operation.

As described above, random noise superposed on a distance measurement result can be easily eliminated, and when it is not determined that a distance measurement result or its integration result is suitable for speed detection, the corresponding integration result is reset, thus preventing erroneous speed detection.

More specifically, according to the fourth embodiment of the present invention, upon repetition of distance measurement operations and integration operations, high-precision speed detection resistant against noise can be performed. When distance data indicates an extremely far distance or when obtained speed data indicates an extremely high speed, it is determined that the data is not suitable for speed detection, and the integration operation is reset. In this manner, erroneous speed detection can be avoided. Therefore, after the integration operation is reset, speed detection is performed using only data which is determined as proper data. For this reason, speed detection free from errors can be easily realized.

A means for alarming the reset operation is arranged. With this means, when the present invention is applied to, e.g., a camera, if a shutter is disabled or a shutter chance may be lost due to successive reset operations, an alarm can be generated, thus providing a camera which is very easy to use.

In the above embodiment, a moving speed of an object is obtained based on an integration output obtained by alternately positively and negatively integrating outputs associated with a plurality of times of distance measurement operations. However, the present invention is not limited to this.

Far-distance discrimination is performed based on distance data. However, the present invention is not limited to this. For example, far-distance discrimination may be performed based on the magnitude of speed data.

Furthermore, 1/distance (1/l) may be calculated in place of the distance l, and may be used as a distance measurement result.

Moreover, a comparator which can latch an output may be used so as to clarify an output of an L signal from the gate.

Figure 17:
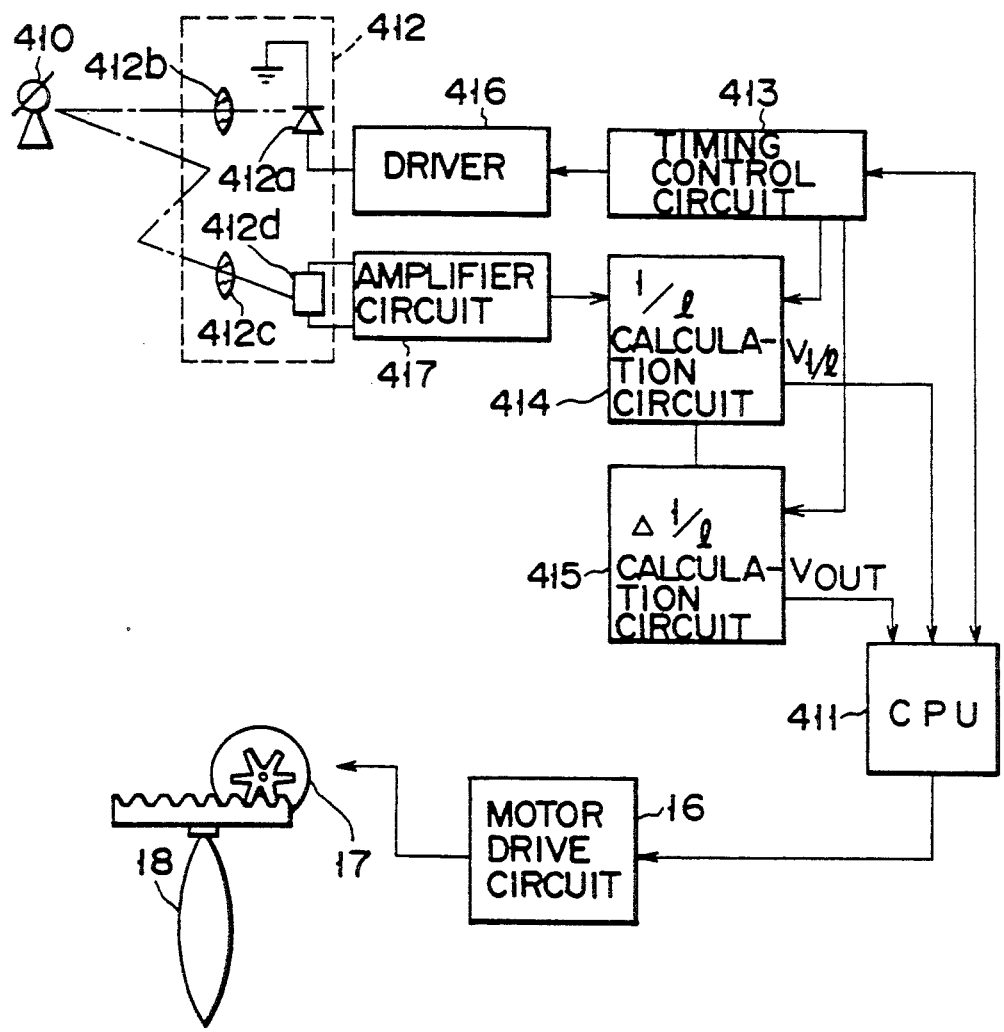
FIG. 17 is a schematic block diagram showing an arrangement of a speed detection apparatus according to the fifth embodiment of the present invention.
Figure 18:
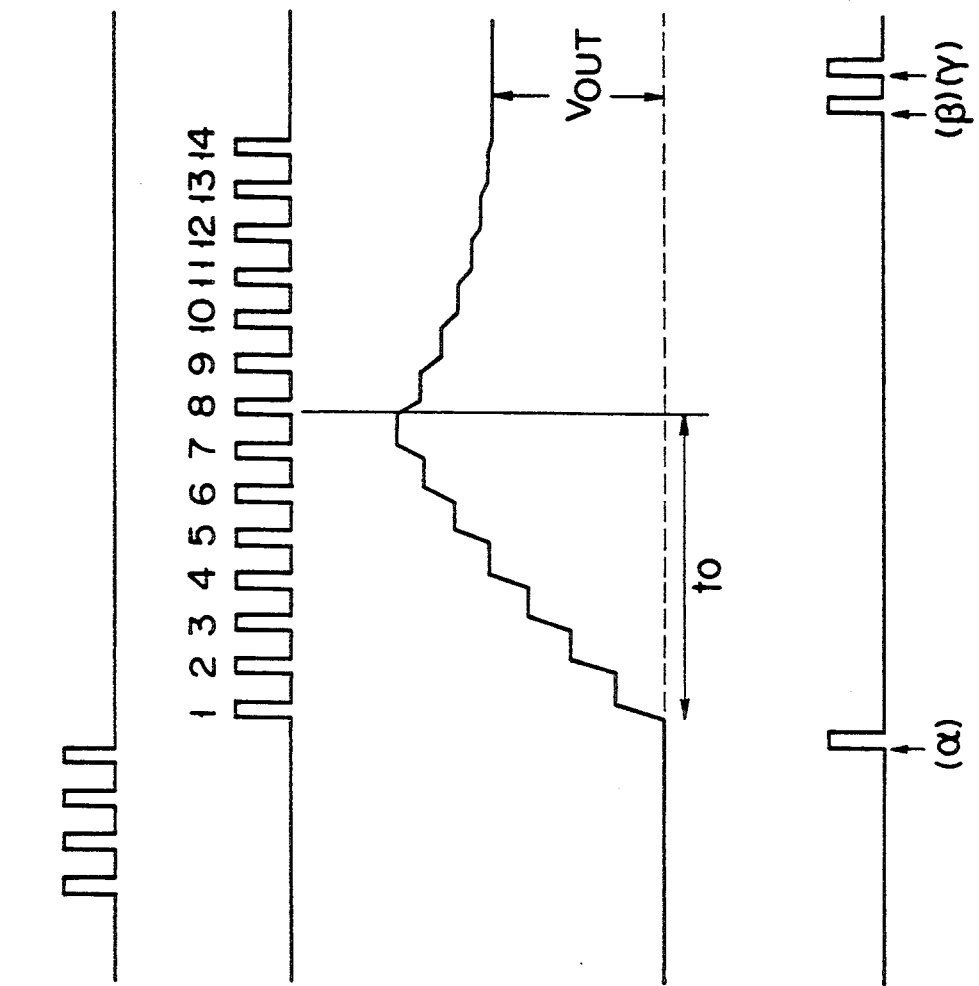
FIGS. 18A to 18D are timing charts for explaining a distance measurement operation of a moving object.

FIG. 17 shows a schematic arrangement of a speed detection apparatus according to the fifth embodiment of the present invention.

More specifically, a CPU 411 controls the overall apparatus, and is connected to a timing control circuit 413, a 1/l calculation circuit 414, and a Δ1/l calculation circuit 415.

The timing control circuit 413 controls drive timings of the 1/l calculation circuit 414, the Δ1/l calculation circuit 415, and a driver 416.

The driver 416 drives an infrared light-emitting diode (IRED) 412a included in a distance measurement optical system 412, and causes the IRED 412a to emit light at a first or second distance measurement timing under the control of the timing control circuit 413.

The distance measurement optical system 412 comprises the IRED 412a, a projection lens 412b for projecting light (infrared light signal) from the IRED 412a toward an object 410, a light-receiving lens 412c for receiving light reflected by the object 410, and an optical position detection element (PSD) 412d for generating signal currents $I_1$ and $I_2$ according to an incident position of the reflected signal light received by the light-receiving lens 412c.

The 1/l calculation circuit 414 extracts a signal light component from a output signal of the PSD 412d supplied through an amplifier circuit 417, and calculates it in an analog manner, thus obtaining a distance signal (distance measurement result) proportional to a reciprocal number of a distance l to the object 410. In this case, the PSD 412d outputs a signal depending on a reciprocal number of the object distance l on the basis of light emission of the IRED 412a. The output signal is amplified by the amplifier circuit 417, and thereafter, distance measurement calculations are performed at a plurality of different timings under the control of the timing control circuit 413.

The $\Delta 1/l$ calculation circuit 415 calculates a rate of displacement over time of the object 410 on the basis of an output from the 1/l calculation circuit 414. The rate of displacement over time to be obtained is defined as follows on the basis of a time $t_0$ for which the object 410 is displaced from, e.g., a first measurement distance $(1/l_1)$ to a second measurement distance $(1/l_2)$ at different timings:

$$\Delta 1/l = (1/l_2 - 1/l_1)/t_0 \tag{1d}$$

Unlike a speed v, $\Delta/1l$ is not given by:

$$v = (l_2 - l_1)/t \tag{2d}$$

(where $l_1$ and $l_2$ are the object distances, and t is the time required for an object to be displaced from $l_1$ to $l_2$). Thus, in order to discriminate $\Delta 1/l$ from the speed v, it is positively called the rate of displacement over time here.

The CPU 411 controls drive timings of the timing control circuit 413, and performs a distance measurement of a moving object, i.e., predicts the position of the object 410 after an elapse of a predetermined period of time, on the basis of an output from the 1/l calculation circuit 414 and an output from the $\Delta 1/l$ calculation circuit 415. The CPU 411 comprises a table (storage means) comprising, e.g., a ROM, and looks up this table on the basis of the two output results, thereby obtaining a correction amount to the predicted position. Thereafter, a taking lens 418 is moved to an in-focus position by the above-mentioned method on the basis of this correction amount.

The correction amount represents an amount $(\Delta 1/lx)$ of correction for a distance measurement result $1/l_1$ with respect to the initial position of the object 410 when a lens is to be driven to a predicted in-focus position lx in, e.g., a camera.

FIGS. 18A to 18D show operations associated with the distance measurement of a moving object.

In a first distance measurement operation, a reciprocal number $1/l_1$ of a distance l at the initial position of the object 410 is obtained by the 1/l calculation circuit 414. In this case, if a distance measurement time is long, the object 410 moves during this time. For this reason, the first distance measurement operation is performed within a short period of time (first distance measurement timings).

A second distance measurement operation is then performed at second distance measurement timings for defining a longer distance measurement time than that defined by the first distance measurement timings, and the 1/l calculation circuit 414 calculates a reciprocal number $1/l_2$ of the object distance l at a position different from the above-mentioned position.

The $\Delta 1/l$ calculation circuit 415 then calculates a displacement amount $\Delta 1/l$ over time of the object 410 using the second distance measurement results $1/l_2$. In this embodiment, the second distance measurement results $1/l_2$ are integrated in the positive and reverse directions, thus obtaining an integration output (moving object detection signal) $V_{OUT}$.

In this case, the integration output is obtained based on 14 distance measurement results, i.e., is obtained by integrating the distance measurement results up to the seventh light emission operation of the IRED 412a in the positive direction, and by integrating the distance measurement result after the eighth light emission in the negative (reverse) direction. In this case, since a time difference $t_0$ between the first and eighth distance measurement timings is equal to time differences between the second and ninth timings, between the third and 10th timings, ..., the moving object detection signal $V_{OUT}$ becomes an output depending on the rate of displacement $\Delta 1/l$ over time when the distance measurement result 1/l is changed for the time difference $t_0$.

The CPU 411 reads the first distance measurement result $1/l_1$ at a timing ($\alpha$) as a distance signal $V1/l$, and reads the moving object detection signal $V_{OUT}$ (displacement amount $\Delta 1/l$ over time) at a timing ($\beta$), thereby executing a correction calculation (to be described later) at a timing ($\gamma$). More specifically, the distance measurement result $1/l_1$ is corrected on the basis of the rate of displacement $\Delta 1/l$ over time, thus obtaining a reciprocal number $1/lx$ of the distance l to the object 410 at a predetermined timing, i.e., the position of the object 410 after an elapse of a predetermined period of time.

In general, in, e.g., a camera, since an extension amount of a focusing lens has a linear relationship with a distance measurement result 1/l, the value $1/lx$ obtained here can be easily converted to the extension amount.

The correction calculation will be explained below.

When the displacement amount $\Delta 1/l$ over time of the object 410 is obtained by the $\Delta 1/l$ calculation circuit 415, it is expressed by equation (1d) described above. On the other hand, a distance l to the object 410 is assumed to change by:

$$l = l_1 - vt \tag{3d}$$

(where t is the time, and $l_1$ is the initial position of the object 410). The speed v at that time is equal to a value given by equation (2d) described above.

If equation (1d) is modified to obtain the speed v, we have:

$$\begin{aligned}(\Delta 1/l) \cdot t_0 &= 1/l_2 - 1/l_1 \\ &= 1/(l_1 - vt_0) - 1/l_1 \\ \therefore 1/(l_1 - vt_0) &= (\Delta 1/l) \cdot t_0 + 1/l_1 \\ \therefore l_1 - vt_0 &= 1/\{(\Delta 1/l) \cdot t_0 + 1/l_1\}\end{aligned} \tag{4d}$$

-continued
$$v = [l_1 - 1/\{(\Delta 1/l) \cdot t_0 + 1/l_1\}]/t_0$$

If a distance to the object 410 is $l_3$ (predicted in-focus position lx) at a predetermined timing $t_2$, equation (3d) described above can be rewritten as:

$$l_3 = l_1 - v \cdot t_2 \tag{5d}$$

Assuming that a correction amount for forming a focal point at the distance $l_3$ is obtained, if the distance measurement result $1/l_1$ obtained by the $1/l$ calculation circuit 414 is to be corrected, the correction amount $\Delta 1/lx$ is assumed to be defined by:

$$\Delta 1/lx = 1/l_3 - 1/l_1 \tag{6d}$$

When equations (4d) and (5d) are substituted in equation (6d), we have:

$$\begin{aligned}
\Delta 1/lx &= 1/(l_1 - v \cdot t_2) - 1/l_1 \\
&= 1/[l_1 - [l_{101}/\{(\Delta 1/l) \cdot t_0 + 1/l_1\}] \cdot t_2/t_0] - 1/l_1 \\
&= 1/\{l_1[1 - [1/\{(\Delta 1/l)l_1 \cdot t_0 + 1\}] \cdot t_2/t_0]\} - 1/l_1 \\
&= \dfrac{1 - 1 - \left[1 - \dfrac{1}{\{(\Delta 1/l)l_1 \cdot t_0 + 1\}}\right] \cdot \dfrac{t_2}{t_0}}{l_1\left[1 - \left[1 - \dfrac{1}{\{(\Delta 1/l)l_1 \cdot t_0 + 1\}}\right] \cdot \dfrac{t_2}{t_0}\right]} \\
&= 1/\left\{l_1\left[1 - \dfrac{t_0}{t_2}\left(\dfrac{(\Delta 1/l)l_1 \cdot t_2 + 1}{(\Delta 1/l)l_1 \cdot t_2}\right)\right]\right\} \\
&= 1/\left[l_1\left\{1 - \dfrac{t_0}{t_2}\left(1 + \dfrac{1}{(\Delta 1/l)l_1 \cdot t_2}\right)\right\}\right]
\end{aligned} \tag{7d}$$

In this case, times $t_0$ and $t_2$ can be processed as constants, and hence, the correction amount $\Delta 1/lx$ can be obtained based on the initial position $l_1$ and the displacement amount $\Delta 1/l$ over time of the object 410. In this case, when the correction amount $\Delta 1/lx$ is to be obtained by the above-mentioned strict correction calculation, a time lag caused by the calculation, or the number of ROM bytes required for calculation software of the CPU 411 cannot be ignored.

Thus, according to the present invention, for example, the table is looked up using the distance measurement result $1/l$ and the rate of displacement $\Delta 1/l$ over time of the object 410, so that the correction amount $\Delta 1/lx$ can be obtained by a simple method.

Note that the arrangement and operation of the distance measurement optical system 412 are the same as those of the distance measurement optical system 12 described above, and a detailed description thereof will be omitted.

Figure 19:
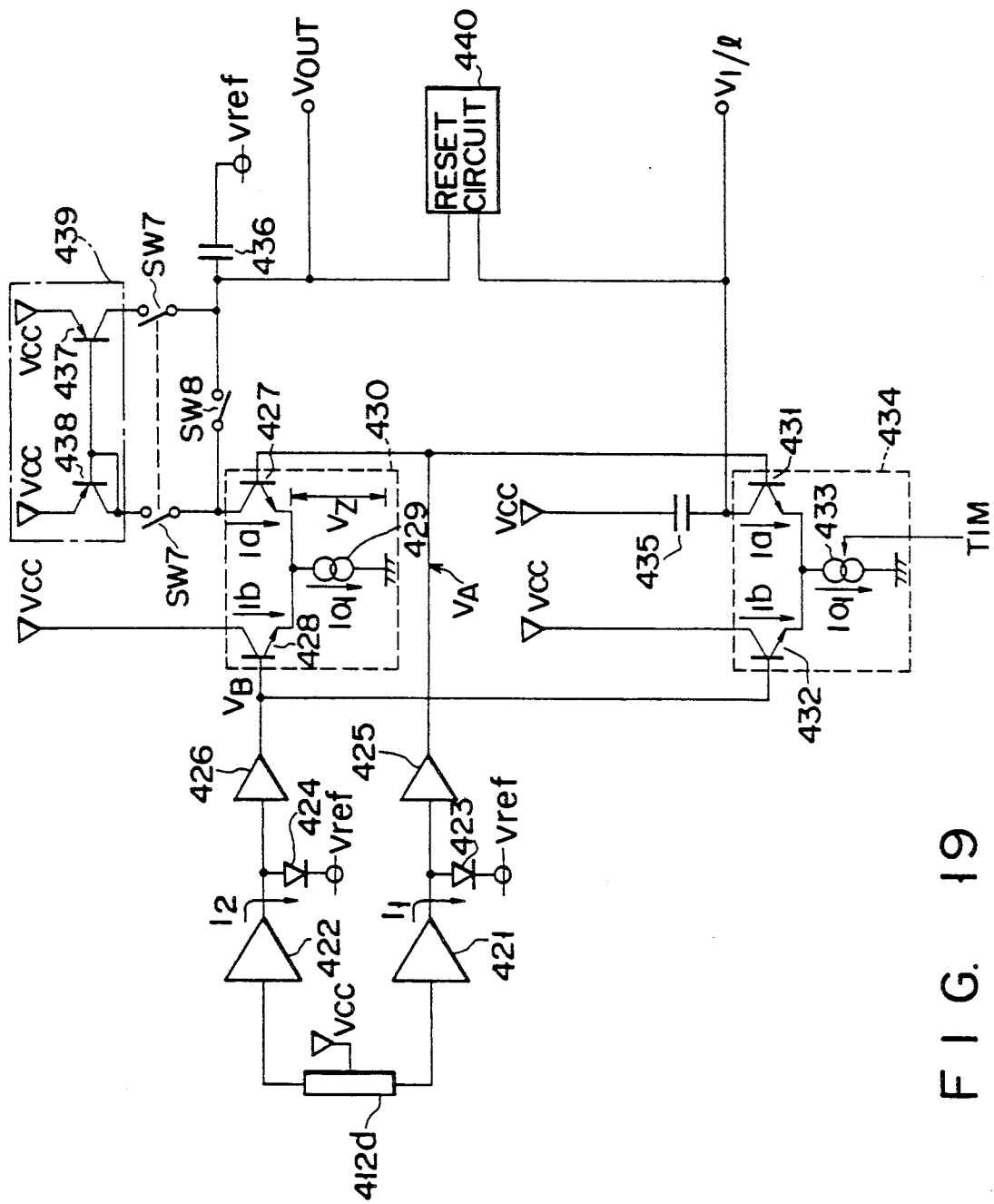
FIG. 19 is a detailed circuit diagram of a portion of FIG. 17.

FIG. 19 shows a detailed circuit arrangement for obtaining the distance signal $V_{1/l}$ and the moving object detection signal $V_{OUT}$ using the output signals $I_1$ and $I_2$ from the PSD 412d.

In FIG. 19, reference numerals 421 and 422 denote preamplifiers for respectively extracting the output signals $I_1$ and $I_2$ from the PSD 412d, which are generated in correspondence with light emission by the IRED 412a, at a low input impedance, and amplifying the extracted signals; and 423 and 424, compression diodes for respectively compressing only signal light components of the amplified currents $I_1$ and $I_2$.

Reference numerals 425 and 426 denote buffers for supplying compressed voltages from the compression diodes 423 and 424 to a differential calculation circuit 30 consisting of NPN transistors 427 and 428, and a current source 429.

The operation of the differential calculation circuit 430 will be explained below using reference symbols in FIG. 19. In this case, the following relations are established:

$$V_A = V_T \ln \dfrac{Ia}{Is} + V_Z = V_{\text{ref}} + V_T \ln \dfrac{I_1}{Is} \tag{8d}$$

$$V_B = V_T \ln \dfrac{Ib}{Is} + V_Z = V_{\text{ref}} + V_T \ln \dfrac{I_2}{Is} \tag{9d}$$

where Is is the reverse saturation current of the diode 423 or 424, and $V_T$ is the thermal voltage.

Currents Ia and Ib satisfy the following relation:

$$Ia + Ib = I_{01} \tag{10d}$$

Therefore, from equations (8d), (9d), and (10d), the following relation can be established:

$$Ia = \dfrac{I_1}{I_1 + I_2} \cdot I_{01} \tag{11d}$$

Therefore, from equations (7) and (11d), we have:

$$\begin{aligned}
Ia &= \dfrac{1}{tp}\left(a + \dfrac{S \cdot f}{l}\right) \cdot I_{01} \\
&= \dfrac{a}{t} \cdot I_{01} + \dfrac{S \cdot f}{tp} \cdot I_{01} \cdot \dfrac{1}{l}
\end{aligned} \tag{12d}$$

As a result, a signal current Ia proportional to the reciprocal number of the object distance l can be obtained.

Since a differential calculation circuit 434 consisting of transistors 431 and 432, and a current source 433 satisfies the same relation, the current Ia flowing through the collector of the transistor 431 has the same value as that given by equation (12d).

The current source 433 is turned on in response to a timing signal TIM only when the IRED 412a emits light. Therefore, the signal current Ia given by equation (12d) is sequentially integrated by an integration capacitor 435, and the distance measurement result $1/l_1$ is calculated based on the output (distance signal $V_{1/l}$) from this capacitor.

Of H/L states in the first distance measurement shown in FIGS. 18A to 18D, an H state means light emission of the IRED 412a, and an ON operation of the current source 433.

On the other hand, the rate of displacement $\Delta 1/l$ over time of the object 410 is calculated by the ON/OFF operations of switches SW7 and SW8, and is extracted as a voltage output (moving object detection signal $V_{OUT}$) of an integration capacitor 436.

More specifically, the switch SW7 is turned on at first to seventh distance measurement timings of the second distance measurement operation shown in FIGS. 18A to 18D in synchronism with light emission of the IRED 412a. At this time, the signal current Ia flows into the integration capacitor 436 upon operation of a current mirror circuit 439 consisting of PNP transistors 437 and 438. Therefore, the voltage output from the capacitor 436 is expressed as an integration result in the positive direction, as shown in FIGS. 18A to 18D.

The switch SW8 is turned on at eighth to 14th distance measurement timings of the second distance measurement shown in FIGS. 18A to 18D in synchronism with light emission of the IRED 412a. In this case, the signal current Ia flows out from the integration capacitor 436. Therefore, a voltage output from the capacitor 437 is expressed as an integration result in the negative (reverse) direction, as shown in FIGS. 18A to 18D.

The outputs ($V_{1/l}$ and $V_{OUT}$) are A/D-converted, and fetched upon operation of the CPU 411, and these data are then subjected to the correction calculation. More specifically, the correction amount $\Delta 1/lx$ is obtained, as described above, and is used to correct the first distance measurement result $1/l_1$, as shown in equation (6d), thereby obtaining the reciprocal number $1/lx$ of the distance l of the object 410 at a predetermined timing.

Note that a reset circuit 440 is arranged to initialize the two integration capacitors 435 and 436, and its operation is canceled when the integration operation is started.

A method of obtaining a correction amount by looking up a table will be described below.

Figure 20:
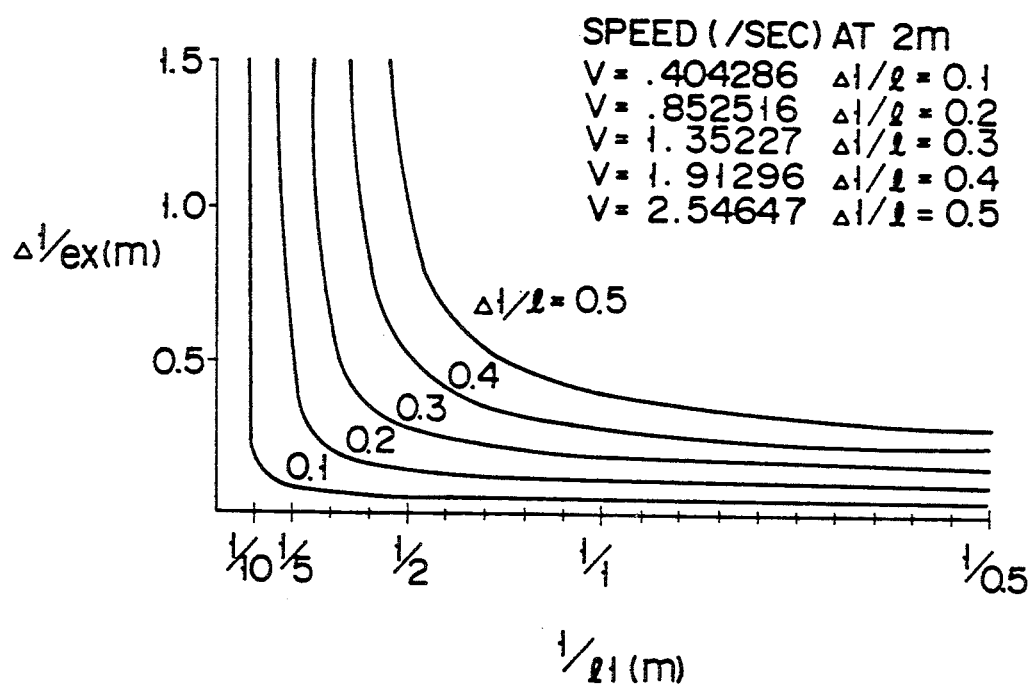
FIG. 20 is a graph showing a rate of displacement over time of an object with respect to a distance measurement result and a correction amount.

FIG. 20 illustrates equation (7d) as a graph.

More specifically, the correction amount $\Delta 1/lx$ (m) is plotted along the ordinate, and the first distance measurement result $1/l_1$ (m) is plotted along the abscissa. FIG. 20 exemplifies cases wherein rates of displacement $\Delta 1/l$ over time = 0.1, 0.2, 0.3, 0.4, and 0.5.

As can be seen from FIG. 20, the rates of displacement $\Delta 1/l$ over time of the respective values define curves at almost equal intervals. This demonstrates that if an internal ROM of the CPU 411 is provided with a table for obtaining the correction amount $\Delta 1/lx$ based on the distance measurement result $1/l_1$ (distance signal $V_{OUT}$), and the rate of displacement $\Delta 1/l$ over time (moving object detection signal $V_{OUT}$), even when the rate of displacement $\Delta 1/l$ over time has a value up to the second decimal place like 0.15, the correction amount $\Delta 1/lx$ at that time can be easily obtained by an interpolation calculation.

Figure 21:
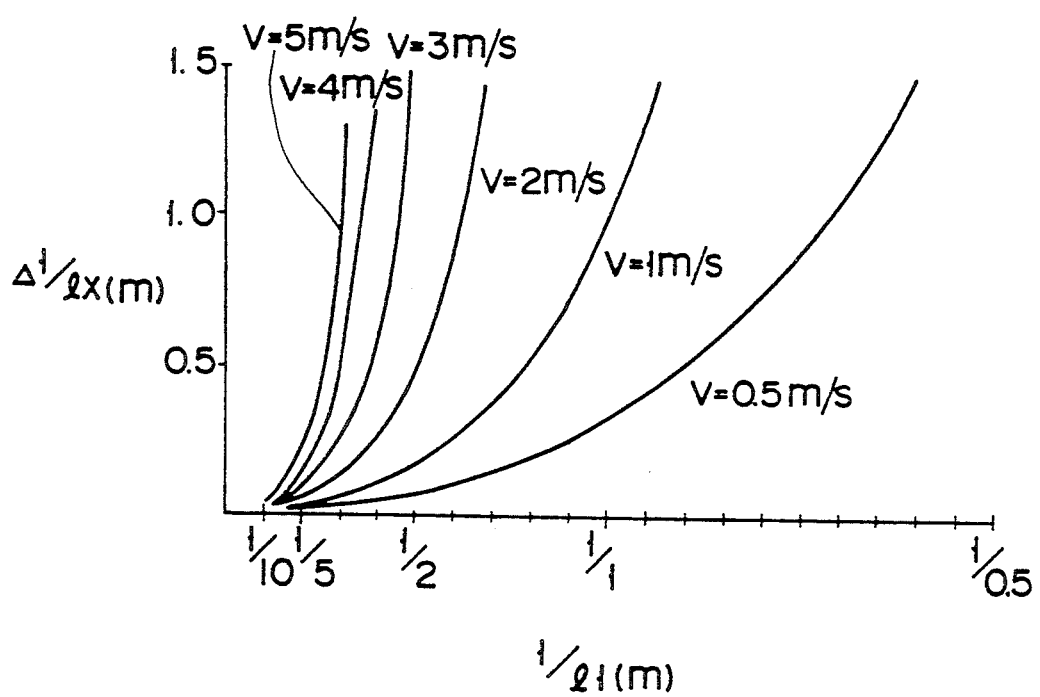
FIG. 21 is a graph showing a speed with respect to an object distance and a correction amount.

Therefore, when this method is employed, the precision of the interpolation calculation is superior to that in a method of obtaining the correction amount $\Delta 1/lx$ based on the speed v and the object distance l1, as shown in, e.g., FIG. 21. That is, the precision of the interpolation calculation can be prevented from being impaired as the speed v is decreased when the speed v is expressed by a linear function.

FIG. 22 shows a table for obtaining the correction amount $\Delta 1/lx$ based on the distance measurement result $1/l_1$ and the rate of displacement $\Delta 1/l$.

If the correction amount becomes extremely large, for example, exceeds 1.0 (1/m), the above-mentioned correction calculation is not performed, and an alarm operation is performed. As the alarm operation, in, e.g., a camera, an LED in a finder may be turned on/off, or a tone generation element may be driven, thus signaling to a user. Furthermore, a release operation may be inhibited.

As can be seen from FIG. 20, in a region with a large distance measurement result $1/l_1$, the correction amount $\Delta 1/lx$ does not so depend on the distance measurement result $1/l_1$. For this reason, when the distance measurement result $1/l_1$ exceeds, e.g., 1/1.25 (m), the correction amount $\Delta 1/lx$ is set to be the same data.

Furthermore, when the rate of displacement $\Delta 1/l$ over time is equal to or smaller than 0.1, or when the distance measurement result $\Delta 1/l$ is equal to or smaller than 0.25 (m), the correction calculation (correction amount $\Delta 1/lx = 0$) is not performed.

When the distance measurement result $1/l_1 = 1/1.67$ (m), and the rate of displacement $\Delta 1/l$ over time = 0.25, i.e., when neither parameters are present on the table, the CPU 411 performs an interpolation calculation using data when the rate of displacement $\Delta 1/l$ over time = 0.2 and data when the rate of displacement $\Delta 1/l$ over time = 0.3. More specifically, $$\Delta 1/l \times (0.25) = \frac{\Delta 1/l \times (0.2) + \Delta 1/l \times (0.3)}{2}$$
$$= \frac{0.15 + 0.25}{2}$$
$$= 0.2 \; (1/m)$$

As described above, according to the fifth embodiment of the present invention, the position of an object after an elapse of a predetermined period of time can be predicted without performing a complicated calculation, e.g., a reciprocal number calculation.

More specifically, a distance signal depending on the initial position of an object is obtained in the first distance measurement, a rate of displacement over time is obtained in the second distance measurement, and a table is looked up using these two outputs, thereby obtaining a correction amount from the initial position for the predicted position. Thus, since no complicated reciprocal number calculation is required, a time lag required for calculations can be shortened as much as possible. Therefore, effective processing can be performed within a short period of time with a simple arrangement, and high-speed, high-precision moving object distance measurement can be realized.

In particular, in, e.g., a camera, since an extension amount of a focusing lens is almost proportional to a reciprocal number (1/lx) of a distance at a predicted in-focus position, the lens is extended in accordance with the reciprocal number 1/lx calculated based on the correction amount obtained from the table, so that a just-in-focus photograph of a moving object can be easily taken.

In the above embodiment, the first and second distance measurement operations are separately performed. However, the present invention is not limited to this. For example, some distance measurement timings in a given distance measurement operation may be used for the first distance measurement, and some or all of the timings may be used for the second distance measurement.

As described above, according to the present invention, a speed detection apparatus which can detect a moving speed of an object at high speed with high precision, and can be realized by a relatively simple arrangement can be provided.

The present invention is not limited to the above-mentioned embodiments, and various changes and modifications may be made without departing from the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A speed detection apparatus comprising:
   projection means for repetitively projecting a pulse beam a predetermined number of times toward an object;
   light-receiving means, arranged to be separated from said projection means by a base length, for receiving the pulse beam reflected by the object, and generating an output according to a light-receiving position;
   distance calculation means for calculating a distance signal according to a distance to the object upon reception of a output from said light-receiving means;
   integration means for integrating the distance signal every time the pulse beam is projected; and
   speed calculation means for subtracting from an output of said integration means a product of a distance signal output corresponding to a pulse beam in a last stage of the repetitively projected pulse beams and an object distance measurement time, and calculating a moving speed of the object in an optical axis direction.

2. An apparatus according to claim 1, wherein said light-receiving means includes a semiconductor position detection element, and if currents output from two ends of said semiconductor position detection element are represented by $I_1$ and $I_2$, said distance calculation means calculates $I_1/(I_1+I_2)$.

3. An apparatus according to claim 1, further including means for changing the predetermined number of times in accordance with the distance signal.

4. A speed detection apparatus comprising:
   projection means for repetitively projecting a pulse beam toward an object;
   light-receiving means, arranged to be separated from said projection means by a base length, for receiving the pulse beam reflected by the object, and generating an output according to a light-receiving position;
   distance calculation means for calculating a distance signal according to a distance to the object upon reception of an output from said light-receiving means;
   integration means for integrating the distance signal every time the pulse beam is projected; and
   speed calculation means for calculating a moving speed of the object on the basis of an output from said integration means and an output from said distance calculation means.

5. A speed detection apparatus comprising:
   projection means for repetitively projecting a pulse beam a predetermined number of times toward an object;
   light-receiving means, arranged to be separated from said projection means by a base length, for receiving the pulse beam reflected by the object, and generating an output according to a light-receiving position;
   distance calculation means for calculating a distance signal according to a distance to the object upon reception of an output from said light-receiving means;
   first and second integration means for integrating the distance signal;
   switching means for selectively supplying an output from said distance calculation means to one of said first and second integration means;
   timing means for instructing said projection means to project light, and switching said switching means to supply the output from said distance calculation means to said first integration means during light projection operations in a former half of the predetermined number times, and to supply the output from said distance calculation means to said second integration means during light projection operations in a latter half of the predetermined number times; and
   speed calculation means for calculating a moving speed of the object in an optical axis direction on the basis of a difference between outputs from said first and second integration means.

6. A speed detection apparatus comprising:
   projection means for repetitively projecting a pulse beam toward an object;
   light-receiving means, arranged to be separated from said projection means by a base length, for receiving the pulse beam reflected by the object, and generating an output according to a light-receiving position;
   distance calculation means for calculating a distance signal according to a distance to the object upon reception of an output from said light-receiving means;
   first integration means for integrating the distance signal at a first timing at which the pulse beam is projected;
   second integration means for integrating the distance signal at a second timing at which the pulse beam is projected; and
   speed calculation means for calculating a moving speed of the object in an optical axis direction on the basis of a difference between outputs from said first and second integration means.

7. An apparatus according to claim 6, wherein the first timing corresponds to former continuous projection timings of the light beams repetitively projected by said projection means, and the second timing corresponds to latter continuous projection timings of the light beams repetitively projected by said projection means.

8. An apparatus according to claim 6, wherein the first timing corresponds to odd-numbered projection timings of the light beams repetitively projected by said projection means, and the second timing corresponds to even-numbered projection timings of the light beams repetitively projected by said projection means.

9. A speed detection apparatus comprising:
   projection means for repetitively projecting a pulse beam toward an object;
   light-receiving means, arranged to be separated from said projection means by a base length, for receiving the pulse beam reflected by the object, and generating an output according to a light-receiving position;
   distance calculation means for calculating a distance signal according to a distance to the object upon reception of an output from said light-receiving means;
   integration means for integrating the distance signal to obtain a moving speed of the object;
   projection calculation means for calculating a light emission interval or the number of times of light emissions in accordance with the distance signal at an initial projection timing of the repetitively projected pulse beams;

projection control means for controlling said projection means on the basis of the light emission interval or the number of times of light emissions calculated by said projection calculation means; and speed calculation means for calculating a moving speed of the object in an optical axis direction on the basis of an output from said integration means.

10. An apparatus according to claim 9, wherein said integration means includes a first integration circuit for integrating the distance signal at a first timing, a second integration circuit for integrating the distance signal at a second timing different from the first timing, and a subtraction circuit for calculating a difference between outputs from the first and second integration circuits.

11. A speed detection apparatus comprising:

projection means for repetitively projecting a pulse beam toward an object;

light-receiving means, arranged to be separated from said projection means by a base length, for receiving the pulse beam reflected by the object, and generating an output according to a light-receiving position;

distance calculation means for outputting a current signal according to a distance to the object upon reception of an output from said light-receiving means;

inversion means for inverting a flow direction of the current signal output from said distance calculation means;

integration means for performing a positive integration based on the current signal or a negative integration based on the current signal output from said inversion means in accordance with the light projection operations; and means for calculating a moving speed of the object on the basis of an output from said integration means.

12. An apparatus according to claim 11, wherein said integration means includes means for performing the positive integration during a former half of the repetitive light projection operations, and operating said inversion means to perform the negative integration based on the current signal output from said inversion means in a latter half of the repetitive light projection operations.

13. An apparatus according to claim 11, wherein said integration means includes means for performing the positive integration at odd-numbered projection timings of the pulse beams repetitively projected by said projection means, and performing the negative integration at even-numbered projection timings of the pulse beams repetitively projected by said projection means.

14. A speed detection apparatus comprising:

projection means for repetitively projecting a pulse beam toward an object;

light-receiving means, arranged to be separated from said projection means by a base length, for receiving the pulse beam reflected by the object, and generating an output according to a light-receiving position;

distance calculation means for outputting a distance signal according to a distance to the object upon reception of an output from said light-receiving means;

integration means for performing a positive integration a plurality of times or performing a negative integration a same number of times as the positive integrations on the basis of the distance signal; and means for calculating a moving speed of the object on the basis of an output from said integration means.

15. A speed detection apparatus comprising:

projection means for repetitively projecting a pulse beam toward an object;

light-receiving means, arranged to be separated from said projection means by a base length, for receiving the pulse beam reflected by the object, and generating an output according to a light-receiving position;

distance calculation means for outputting a distance signal according to a distance to the object upon reception of an output from said light-receiving means;

integration means for positively integrating the distance signal at odd-numbered light projection timings, and negatively integrating the distance signal at even-numbered light projection timings;

discrimination means for discriminating on the basis of an output from said integration means whether or not the object is moving at a speed higher than a given limit speed, or whether or not the object is located at a far position, and for, when it is discriminated that the object is moving at a speed higher than the given limit speed or that the object is located at the far position, outputting an alarm signal;

reset means for resetting an integration value of said integration means on the basis of the alarm signal; and speed calculation means for calculating a moving speed of the object in an optical axis direction on the basis of an output from said integration means.

16. An apparatus according to claim 15, wherein said integration means comprises inversion means for inverting a distance current signal output from said distance calculation means, said integration means performing the positive integration by integrating the distance current signal at the odd-numbered light projection timings, and performing the negative integration by integrating an output from said inversion means at the even-numbered light projection timings.

17. An apparatus according to claim 15, further including means for restarting the integration operation after said integration means is reset by said reset means, said speed calculation means calculating the speed of the object on the basis of an output from said integration means after the integration operation is restarted.

18. A speed detection apparatus comprising:

projection means for repetitively projecting a pulse beam toward an object;

light-receiving means, arranged to be separated from said projection means by a base length, for receiving the pulse beam reflected by the object, and generating an output according to a light-receiving position;

distance calculation means for outputting a distance signal according to a distance to the object upon reception of an output from said light-receiving means;

integration means for calculating a moving speed of the object on the basis of an output from said distance calculation means;

discrimination means for discriminating on the basis of an output from said integration means whether or not detection reliability of the moving speed of the object is high, and for, when it is discriminated that the reliability is low, outputting an alarm signal;

reset means for resetting an integration value of said integration means on the basis of the alarm signal; and speed calculation means for calculating a moving speed of the object in an optical axis direction on the basis of an output from said integration means.

19. An apparatus according to claim 18, wherein said discrimination means includes means for, when a speed correspondent value based on the output from said integration means exceeds a predetermined value, discriminating that reliability is low.

20. An apparatus according to claim 18, wherein said integration means includes means for performing a positive integration at former continuous light projection timings of the repetitively projected beams, and performing a negative integration at latter continuous light projection timings of the repetitively projected beams.

21. An apparatus according to claim 18, wherein said integration means includes means for performing a positive integration at odd-numbered light projection timings of the repetitively projected beams, and performing a negative integration at even-numbered light projection timings of the repetitively projected beams.

22. A speed detection apparatus comprising:

projection means for repetitively projecting a pulse beam toward an object;

light-receiving means, arranged to be separated from said projection means by a base length, for receiving the pulse beam reflected by the object, and generating an output according to a light-receiving position;

distance calculation means for outputting a distance signal according to a distance to the object upon reception of an output from said light-receiving means;

integration means for calculating a moving speed of the object on the basis of an output from said distance calculation means;

discrimination means for discriminating on the basis of an output from said distance calculation means whether or not detection reliability of the moving speed of the object is high, and for, when it is discriminated that the reliability is low, outputting an alarm signal;

reset means for resetting an integration value of said integration means on the basis of the alarm signal; and speed calculation means for calculating a moving speed of the object in an optical axis direction on the basis of an output from said integration means.

23. An apparatus according to claim 22, wherein said discrimination means includes means for, when a distance correspondent value of the object based on the output from said distance calculation means indicates a farther position than that indicated by a predetermined value, discriminating that the reliability is low.

24. An apparatus according to claim 22, wherein said integration means includes means for performing a positive integration at former continuous light projection timings of the repetitively projected beams, and performing a negative integration at later continuous light projection timings of the repetitively projected beams.

25. An apparatus according to claim 22, wherein said integration means includes means for performing a positive integration of odd-numbered light projection timings of the repetitively projected beams, and performing a negative integration at even-numbered light projection timings of the repetitively projected beams.

26. A speed detection apparatus comprising:

projection means for repetitively projecting a pulse beam toward and object;

light-receiving means, arranged to be separated from said projection means by a base length, for receiving the pulse beam reflected by the object, and generating an output according to a light-receiving position;

distance calculation means for outputting a distance signal according to a distance to the object upon reception of an output from said light-receiving means;

integration means for integrating the distance signal every time the pulse beam is projected; and speed calculation means for calculating a moving speed of the object on the basis of an output from said integration means.

27. A moving object distance prediction apparatus comprising:

projection means for repetitively projecting a pulse beam toward and object;

light-receiving means, arranged to be separated from said projection means by a base length, for receiving the pulse beam reflected by the object, and generating an output according to a light-receiving position;

distance calculation means for outputting a distance equal inversely proportional to a distance to the object upon reception of an output from said light-receiving means;

storage means for storing an initial position of the object at an initial projection timing of the pulse beams;

displacement rate calculation means for adding the distance signal every time the pulse beam is projected after the initial position is calculated, and outputting a rate of displacement over time of the object; and prediction means for obtaining a correction amount on the basis of the initial position and the rate of displacement over time, and predicting a position of the object after an elapse of a predetermined period of time.

28. An apparatus according to claim 27, further comprising memory means for storing a table for obtaining the correction amount on the basis of the initial position and the rate of displacement over time, and wherein said prediction means includes means for obtaining the correction amount on the basis of the initial position and the rate of displacement over time stored in said memory means, and predicting the position of the object.

29. An auto-focus apparatus comprising:

projection means for projecting a distance measurement beam toward an object;

distance measurement means for receiving the beam projected by said projection means and reflected by the object, and outputting a signal according to a distance to the object;

projection control means for causing said projection means to repetitively project the beam a plurality of times;

prediction means, including integration means for integrating an output from said distance measurement means every time said projection means projects the beam, for predicting a position of the object upon exposure on the basis of the integration result and an output from said distance measurement means; and drive means for driving a taking lens to the predicted position.

30. An apparatus according to claim 29, wherein said prediction means includes:
  integration means for integrating an output from said distance measurement means every time said projection means projects the beam;
  speed detection means for detecting a moving speed of the object on the basis of the integration result and an output from said distance measurement means at a predetermined timing; and
  position determination means for determining the position of the object upon exposure on the basis of the output from said distance measurement means at the predetermined timing, and the moving speed.

31. An apparatus according to claim 30, wherein said predication means includes means for obtaining the position on the basis of the integration result and the output from said distance measurement means at the predetermined timing.

32. An apparatus according to claim 29, wherein said integration means includes:
  first integration means for integrating output signals from said distance measurement means corresponding to the beams projected in a former half of the plurality of times of light projection operations;
  second integration means for integrating output signals from said distance measurement means corresponding to the beams projected in a latter half of the plurality of times of light projection operations; and
  difference calculation means for calculating a difference between the integration results from said first and second integration means.

33. An apparatus according to claim 29, wherein said integration means includes:
  first integration means for integrating output signals from said distance measurement means corresponding to the beams projected at odd-numbered timings of the plurality of times of light projection operations;
  second integration means for integrating output signals from said distance measurement means corresponding to the beams projected at even-numbered timings of the plurality of times of light projection operations; and
  difference calculation means for calculating a difference between the integration results from said first and second integration means.

34. An apparatus according to claim 29, wherein said integration means includes means for dividing the outputs from said distance measurement means corresponding to the plurality of times of light projection operations into former and latter halves, and integrating the outputs while inverting an integration direction in one of the former and latter halves.

35. An apparatus according to claim 29, wherein said integration means includes means for integrating the outputs from said distance measurement means on the basis of odd-numbered beams projected by said projection means by one of positive and negative integrations, and integrating the outputs from said distance measurement means on the basis of even-numbered beams projected by said projection means by the other of positive and negative integrations.

36. An apparatus according to claim 29, wherein said projection control means includes projection change means for changing an interval or the number of times of the light projection operations on the basis of an initial output from said distance measurement means.

37. An apparatus according to claim 29, further including:
  discrimination means for discriminating whether or not an output from said distance measurement means indicates a distance farther than a predetermined distance, or whether or not an output from said integration means is equal to or higher than a predetermined value, and for, when it is discriminated that the output from said distance measurement means indicates a distance farther than the predetermined distance, or that the output from said integration means is equal to or higher than the predetermined value, outputting an alarm signal; and
  reset means for resetting an output from said integration means in response to the alarm signal.

38. An apparatus according to claim 29, further including:
  discrimination means for discriminating whether or not an output from said distance measurement means indicates a distance farther than a predetermined distance, or whether or not an output from said integration means is equal to or higher than a predetermined value, and for, when it is discriminated that the output from said distance measurement means indicates a distance farther than the predetermined distance, or that the output from said integration means is equal to or higher than the predetermined value, outputting an alarm signal; and
  alarm means for performing an alarm display in response to the alarm signal.

* * * * *